United States Patent
Kimchi et al.

(10) Patent No.: US 11,230,371 B2
(45) Date of Patent: Jan. 25, 2022

(54) MAINTAINING ATTITUDE CONTROL OF UNMANNED AERIAL VEHICLES BY VARYING CENTERS OF GRAVITY

(71) Applicant: Amazon Technologies, Inc., Seattle, WA (US)

(72) Inventors: Gur Kimchi, Seattle, WA (US); Dominic Timothy Shiosaki, Seattle, WA (US); Ricky Dean Welsh, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 16/992,074

(22) Filed: Aug. 12, 2020

(65) Prior Publication Data

US 2021/0107633 A1 Apr. 15, 2021

Related U.S. Application Data

(62) Division of application No. 15/435,044, filed on Feb. 16, 2017, now Pat. No. 10,745,115.

(51) Int. Cl.
*B64C 25/26* (2006.01)
*B64C 17/02* (2006.01)
(Continued)

(52) U.S. Cl.
CPC .............. *B64C 25/26* (2013.01); *B64C 17/02* (2013.01); *B64C 25/10* (2013.01); *B64C 25/52* (2013.01);
(Continued)

(58) Field of Classification Search
CPC ......... B64C 25/26; B64C 17/02; B64C 25/10; B64C 25/52; B64C 27/52; B64C 39/024; B64C 2201/027; B64D 31/06
See application file for complete search history.

(56) References Cited

U.S. PATENT DOCUMENTS 9,975,644 B1   5/2018 Kimchi et al.
2008/0046168 A1   2/2008 McCarthy et al.
(Continued)

FOREIGN PATENT DOCUMENTS

WO   2008054234 A1   5/2008

OTHER PUBLICATIONS

International Search Report & Written Opinion for PCT/US2018/017302, dated Jun. 6, 2018.
(Continued)

*Primary Examiner* — Hunter B Lonsberry
*Assistant Examiner* — Mathew Franklin Gordon
(74) *Attorney, Agent, or Firm* — Athorus, PLLC

(57) ABSTRACT

Aerial vehicles may be configured to control their attitudes by changing one or more physical attributes. For example, an aerial vehicle may be outfitted with propulsion motors having repositionable mounts by which the motors may be rotated about one or more axes, in order to redirect forces generated by the motors during operation. An aerial vehicle may also be outfitted with one or more other movable objects such as landing gear, antenna and/or engaged payloads, and one or more of such objects may be translated in one or more directions in order to adjust a center of gravity of the aerial vehicle. By varying angles by which forces are supplied to the aerial vehicle, or locations of the center of gravity of the aerial vehicle, a desired attitude of the aerial vehicle may be maintained irrespective of velocity, altitude and/or forces of thrust, lift, weight or drag acting upon the aerial vehicle.

20 Claims, 22 Drawing Sheets

(51) Int. Cl.
*B64C 25/10* (2006.01)
*B64C 25/52* (2006.01)
*B64C 27/52* (2006.01)
*B64C 39/02* (2006.01)
*B64D 31/06* (2006.01)

(52) U.S. Cl.
CPC ............ *B64C 27/52* (2013.01); *B64C 39/024* (2013.01); *B64D 31/06* (2013.01); *B64C 2201/027* (2013.01)

(56) References Cited

U.S. PATENT DOCUMENTS

| | | |
|---|---|---|
| 2013/0105635 A1 | 5/2013 | Alzu'bi et al. |
| 2016/0122018 A1 | 5/2016 | Matsue et al. |
| 2016/0159468 A1 | 6/2016 | Harris et al. |
| 2017/0015412 A1 | 1/2017 | Matus |
| 2017/0158327 A1 | 6/2017 | Willford |
| 2017/0343645 A1 | 11/2017 | Kim et al. |
| 2018/0072404 A1 | 3/2018 | Prager et al. |
| 2018/0072414 A1 | 3/2018 | Cantrell et al. |

OTHER PUBLICATIONS

Partial International Search Report for PCT/US2018/017302, dated Apr. 16, 2018.

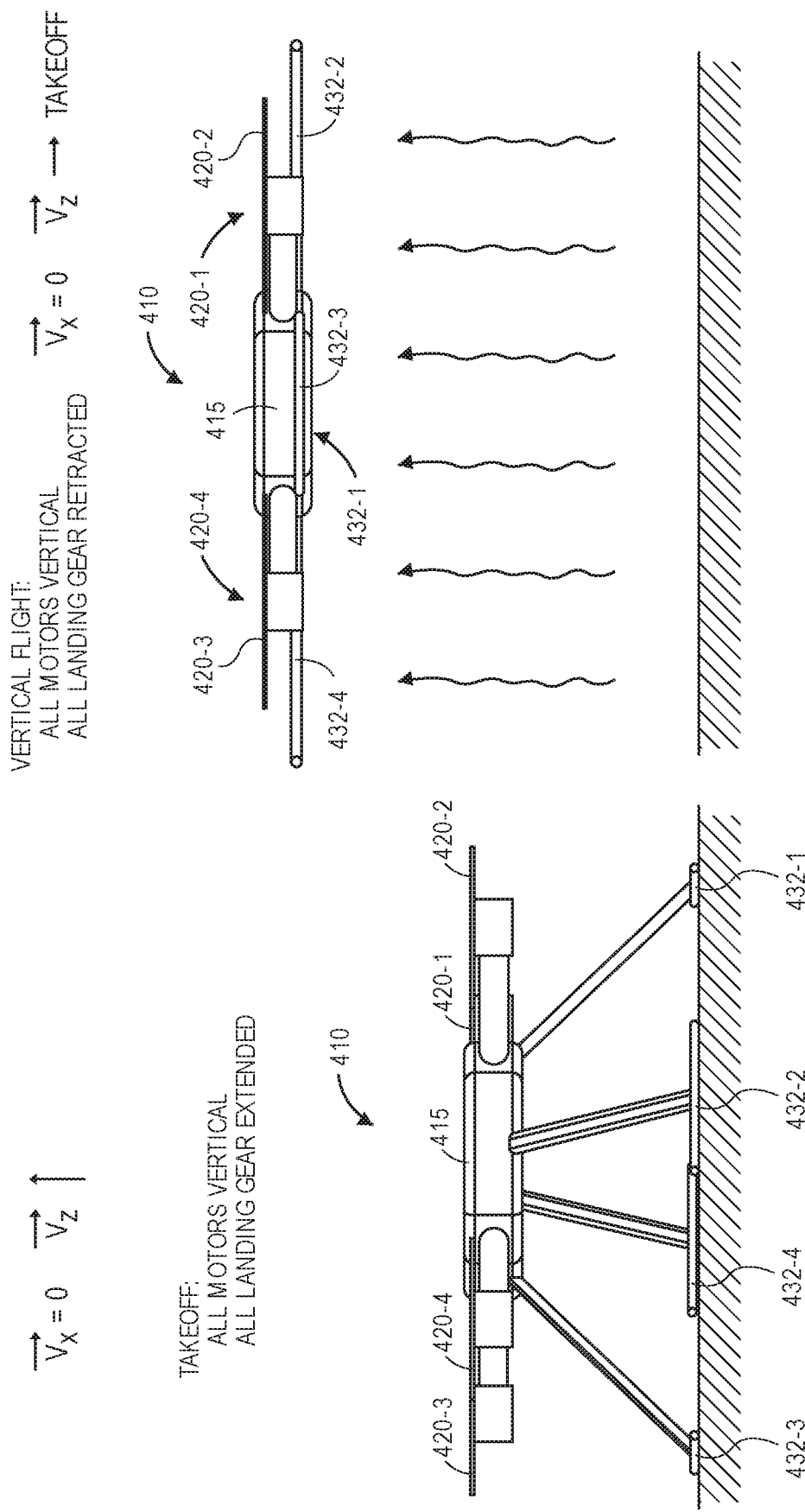

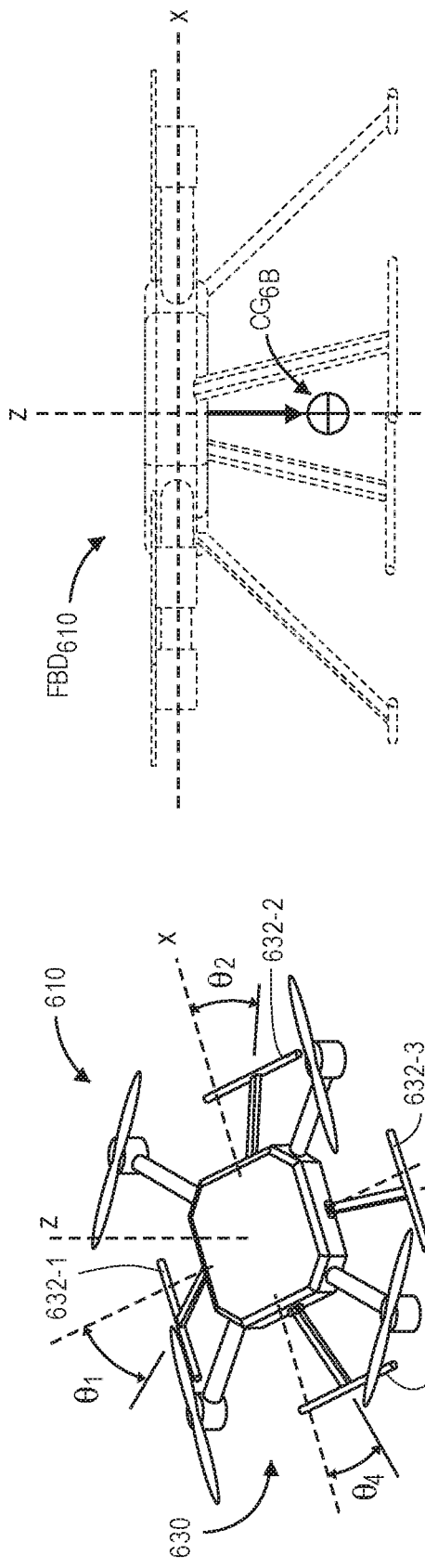
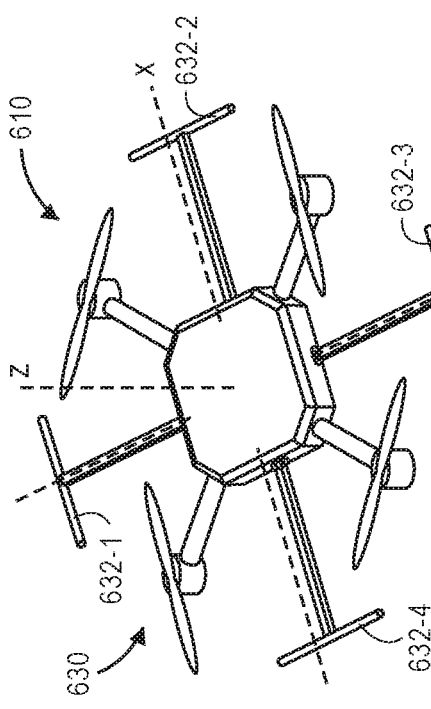
FIG. 6A
FIG. 6B

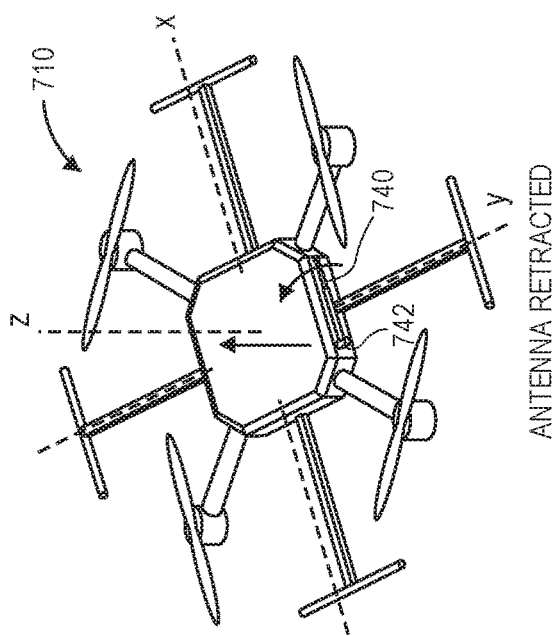
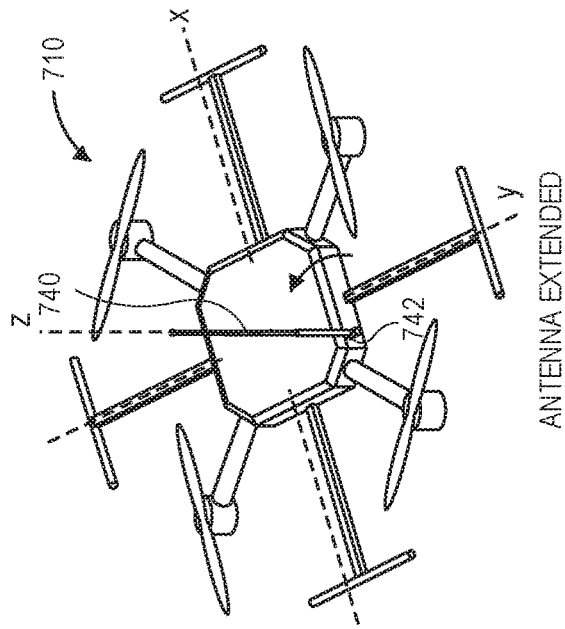
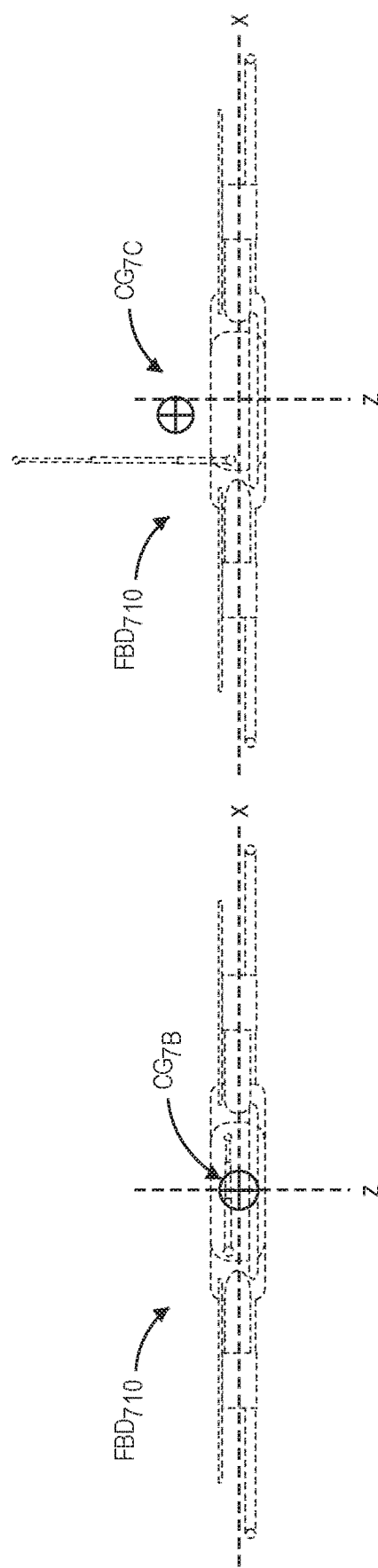

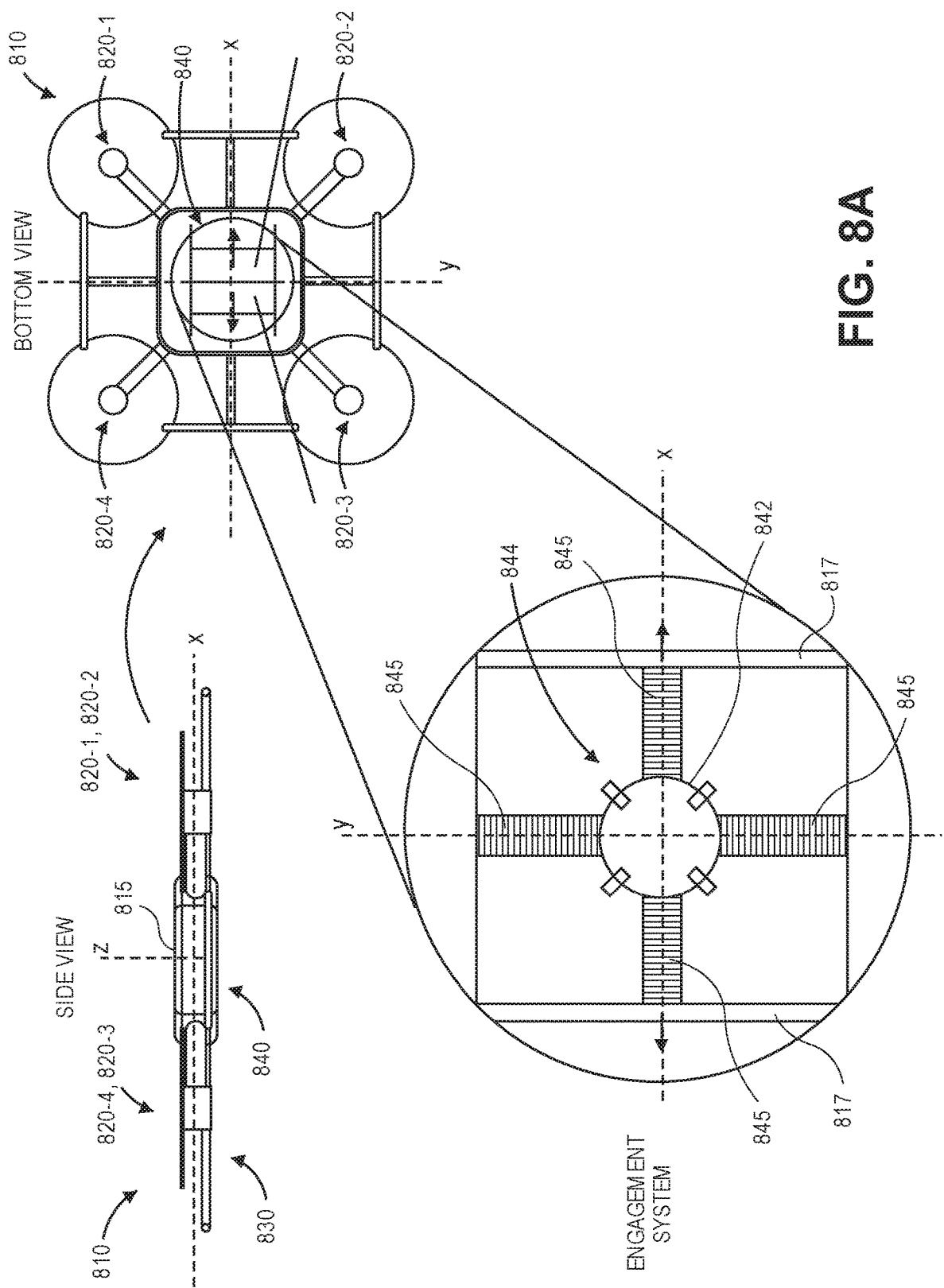

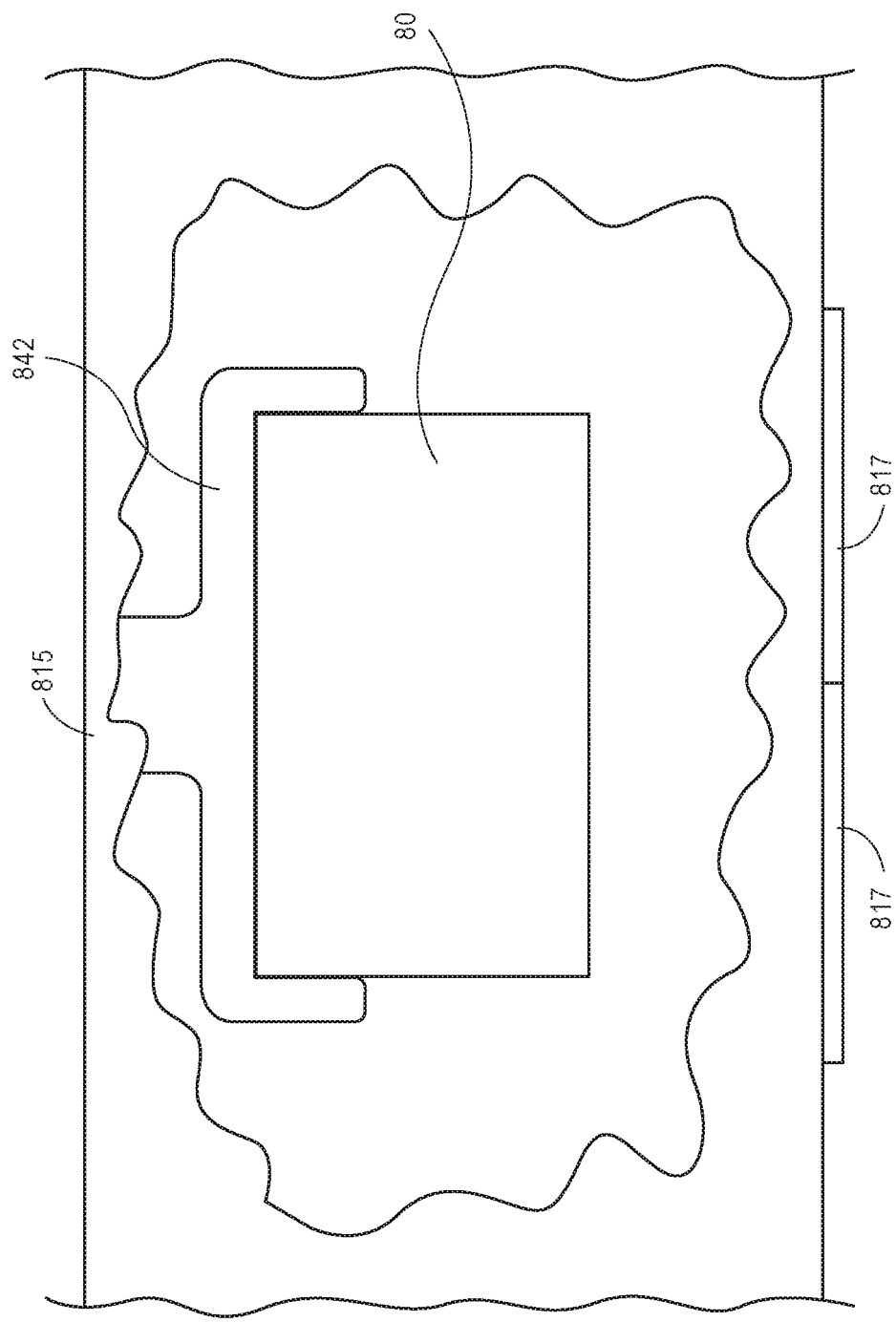

MAINTAINING ATTITUDE CONTROL OF UNMANNED AERIAL VEHICLES BY VARYING CENTERS OF GRAVITY

CROSS-REFERENCE TO RELATED APPLICATIONS

This application is a division of U.S. patent application Ser. No. 15/435,044, filed Feb. 16, 2017, the contents of which are incorporated by reference herein in their entirety.

BACKGROUND

The operation of an unmanned aerial vehicle (or "UAV") is dependent upon a combination of four forces, namely, thrust, drag, weight and lift, the net effects of which may determine an extent and a direction of a velocity of the aerial vehicle. Thrust is a force that is typically generated by one or more aerial propulsors or propulsion units such as rotating bladed propellers or jet engines. Thrust may have a magnitude defined by one or more operating characteristics of the propulsor, e.g., a rotating speed, a number of blades, or sizes of blades of a propeller, or an amount or speed of exhaust expelled from a jet engine, as well as a direction defined by an orientation of the propulsor with respect to an airframe of an aerial vehicle. Thrust is necessary in order to overcome drag, which is a resistive aerodynamic force that is directed in an opposite direction to a direction of travel of the aerial vehicle, due to air that opposes the forward motion of the aerial vehicle. Weight is a force resulting from the Earth's gravitational pull acting on a center of mass (or center of gravity) of the aerial vehicle, in a vertical direction toward the Earth's center. Lift is another aerodynamic force that is generated by propellers, or from flows of air over wings or other control surfaces. Lift counteracts the effects of weight on an aerial vehicle, at least in part. Thrust, drag, weight and lift acting on an aerial vehicle must be placed in balance in order to ensure that the aerial vehicle operates at a desired and safe velocity.

With the exception of weight, each of the forces acting on an operating unmanned aerial vehicle may be affected by wind passing above, below or around the aerial vehicle. Wind may include a number of components that impact an amount of lift generated by a fixed or rotating wing on an aerial vehicle, as well as an extent of thrust or drag applied to the aerial vehicle. For example, a headwind is wind blowing on a front of an aerial vehicle, opposite to its direction of travel, while a tailwind is wind that blows from behind an aerial vehicle, in its direction of travel. Meanwhile, a crosswind is wind that blows laterally into an aerial vehicle, parallel to ground below the aerial vehicle and perpendicular to its direction of travel. Updrafts and downdrafts are winds that blow perpendicular to the ground and originate above or below an aerial vehicle, respectively. Wind that contacts an aerial vehicle typically includes one or more components (e.g., headwinds, tailwinds, crosswinds, updrafts or downdrafts) that impart forces on the aerial vehicle from a number of different directions.

Today, unmanned aerial vehicles are being utilized in an ever-increasing number of missions, including but not limited to surveillance, monitoring or delivery operations. The use of an unmanned aerial vehicle, as opposed to a manned aerial vehicle, carries a number of advantages deriving from the fact that such vehicles are not required to carry humans. For example, unmanned aerial vehicles are typically rigid structures that are lighter, smaller and less expensive than their manned counterparts, and may be used in missions for which human safety or the costs or risks of human operation may be prohibitive. Unfortunately, however, the rigid construction of unmanned aerial vehicles, and their inherent lack of human onboard control, requires unmanned aerial vehicles to adapt to changing circumstances, including planned or unplanned variations in environmental conditions or operational requirements, or material or component failures.

The capacity to rapidly adapt to changing circumstances is particularly acute when aerial vehicles are operating in or transitioning to a hovering flight mode, as a balance between thrust, drag, weight and lift forces acting on an aerial vehicle that is traveling at low speeds or is hovering may be easily upset.

BRIEF DESCRIPTION OF THE DRAWINGS

FIGS. 4A through 4D are views of aspects of an aerial vehicle configured for maintaining attitude control in accordance with embodiments of the present disclosure.

FIGS. 6A through 6C are views of aspects of an aerial vehicle configured for maintaining attitude control in accordance with embodiments of the present disclosure.

FIGS. 7A through 7C are views of aspects of an aerial vehicle configured for maintaining attitude control in accordance with embodiments of the present disclosure.

FIGS. 8A through 8D are views of aspects of an aerial vehicle configured for maintaining attitude control in accordance with embodiments of the present disclosure.

DETAILED DESCRIPTION

As is set forth in greater detail below, the present disclosure is directed to maintaining attitude control of aerial vehicles (e.g., unmanned aerial vehicles) by changing physical attributes of the aerial vehicles. More specifically, the present disclosure describes propulsion motors (or propulsion modules) that may be pivoted, angled or otherwise repositioned about one or more axes in order to vary the vectors of force generated thereby. The present disclosure further describes propulsion motors that are configured to vary their respective centers of gravity by repositioning, extending or retracting one or more onboard appurtenances or other movable objects (e.g., one or more components of landing gear, such as skids or wheels, as well as any antennas or other extensions, or engaged payloads). The unmanned aerial vehicles of the present disclosure are thereby provided with a number of additional options or capacities for traveling at desired courses, speeds, altitudes or orientations in the performance of one or more missions, and are more readily able to respond to changes in circumstances or conditions while meeting or exceeding one or more operational requirements of such missions.

Figure 1A:
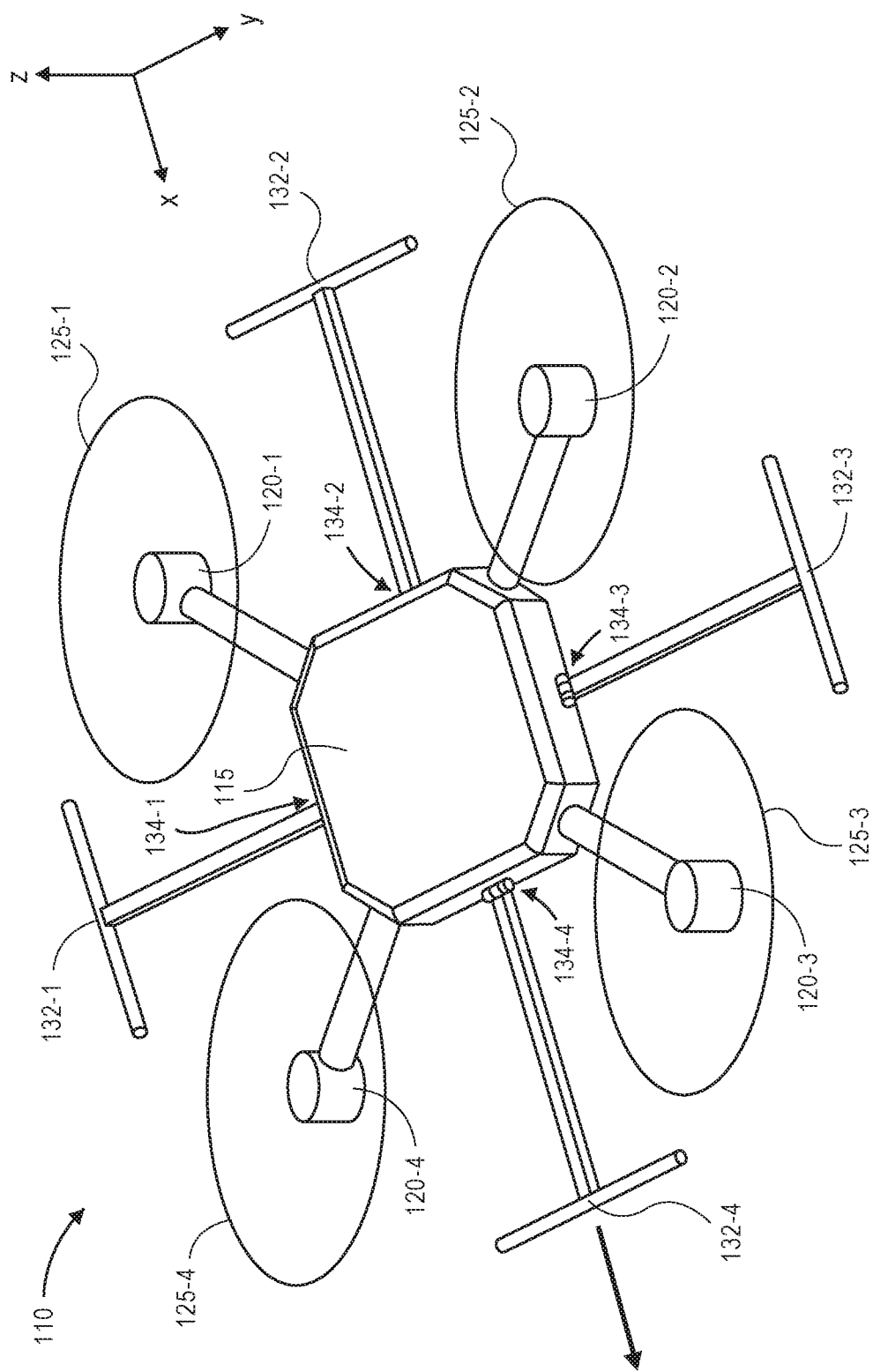
FIGS. 1A through 1G are views of an aerial vehicle configured for maintaining attitude control in accordance with embodiments of the present disclosure.
Figure 1B:
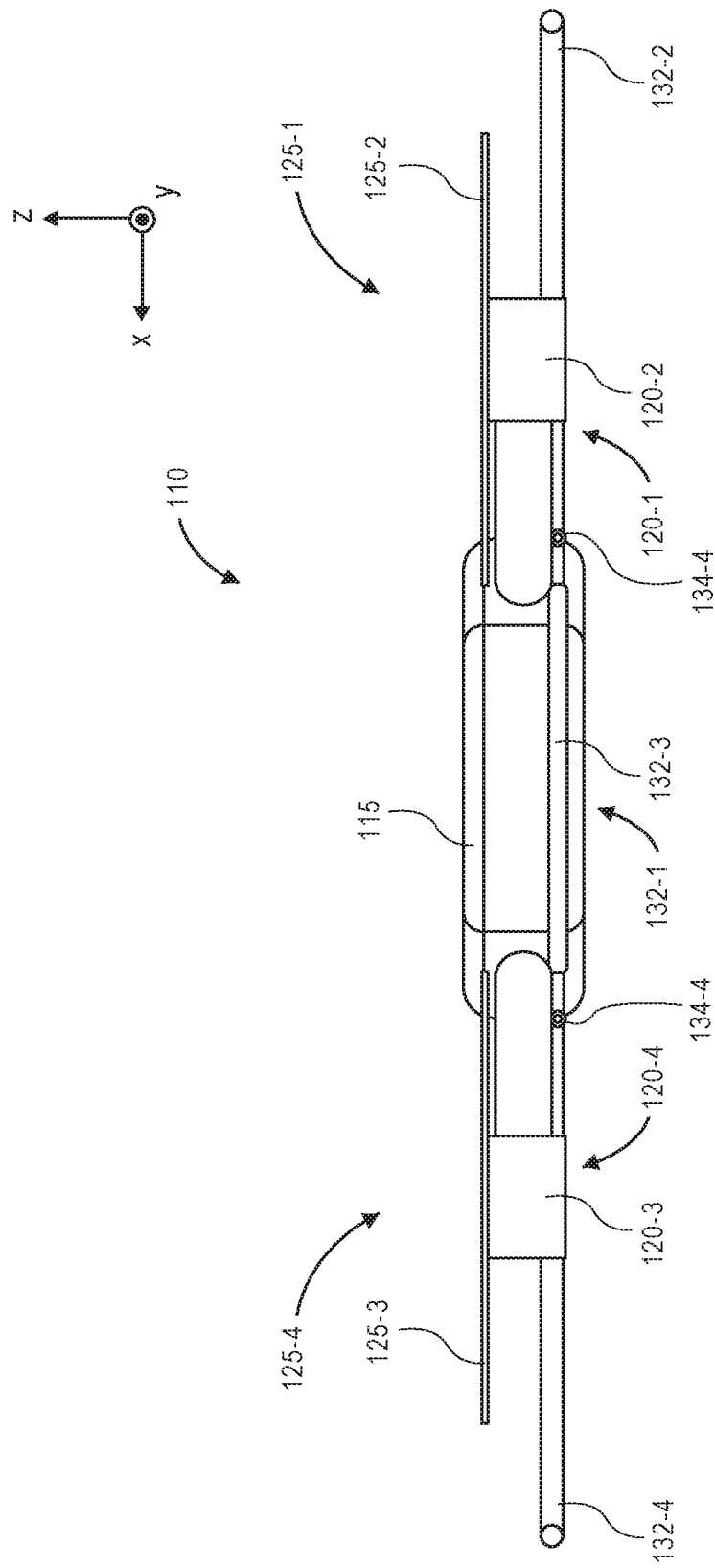

Referring to FIGS. 1A through 1G, views of one aerial vehicle 110 that is configured for maintaining attitude control in accordance with embodiments of the present disclosure is shown. As is shown in FIGS. 1A and 1B, the aerial vehicle 110 includes a central console (e.g., an airframe) 115, plurality of propulsion motors 120-1, 120-2, 120-3, 120-4 and a set of landing gear 130 that includes a plurality of landing skids (or other movable objects) 132-1, 132-2, 132-3, 132-4. Each of the propulsion motors 120-1, 120-2, 120-3, 120-4 is rotatably mounted to the central console 115 and configured to rotate a propeller 125-1, 125-2, 125-3, 125-4 at any selected rotational speed. Each of the propulsion motors 120-1, 120-2, 120-3, 120-4 is also configured to rotate about a mounting axis, e.g., by one or more servo motors or like components (not shown).

Each of the landing skids 132-1, 132-2, 132-3, 132-4 is rotatably mounted to the central console by a motorized hinge 134-1, 134-2, 134-3, 134-4 that may be configured to rotate a corresponding one of the landing skids 132-1, 132-2, 132-3, 132-4 about an axis between a retracted state (e.g., as is shown in FIGS. 1A and 1B), or an extended state, or to any intervening angle or orientation between the retracted state and the extended state. Operations of the propulsion motors 120-1, 120-2, 120-3, 120-4 and/or the motorized hinges 134-1, 134-2, 134-3, 134-4 may be controlled by one or more onboard or external computer devices, including one or more computer devices maintained within the central console 115, or in one or more alternate or virtual locations, e.g., in a "cloud"-based environment.

Figure 1C:
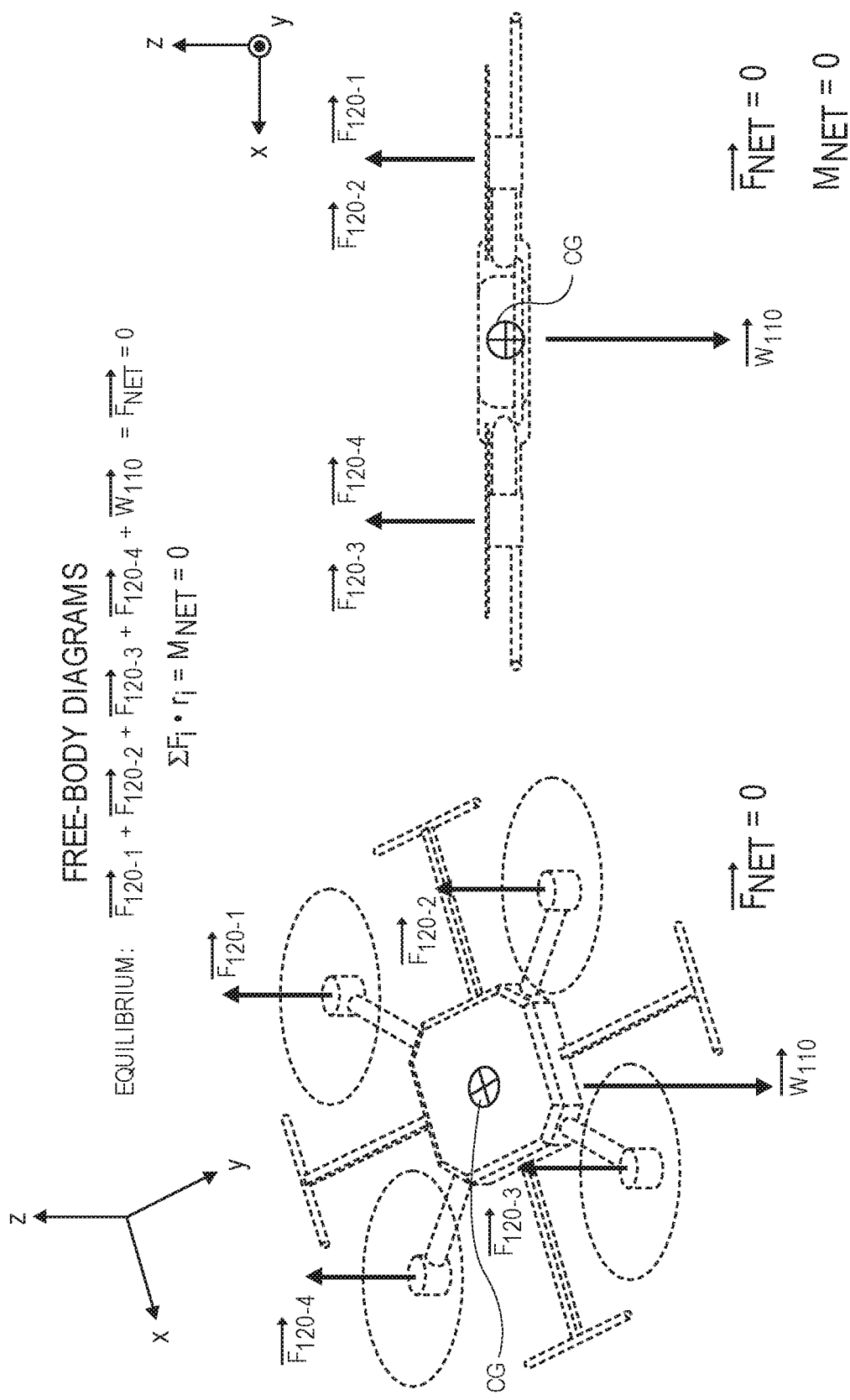

By causing the rotation of their respective propellers 125-1, 125-2, 125-3, 125-4, one or more of the propulsion motors 120-1, 120-2, 120-3, 120-4 may impart forces upon the aerial vehicle 110 in directions corresponding to the axes about which the propellers 125-1, 125-2, 125-3, 125-4 are rotated. For example, as is shown in the free-body diagrams $FBD_{110}$ of FIG. 1C, where the propulsion motors 120-1, 120-2, 120-3, 120-4 are configured to rotate the propellers 125-1, 125-2, 125-3, 125-4 about substantially vertical axes, the propulsion motors 120-1, 120-2, 120-3, 120-4 generate lifting forces $F_{120-1}$, $F_{120-2}$, $F_{120-3}$, $F_{120-4}$ in substantially vertical directions. Such forces $F_{120-1}$, $F_{120-2}$, $F_{120-3}$, $F_{120-4}$ counteract the weight of the aerial vehicle 110, or $w_{110}$, which acts upon a center of gravity CG of the aerial vehicle 110, as is shown in FIG. 1C. Thus, in the condition shown in FIG. 1C, the aerial vehicle 110 is in equilibrium, and the net forces $F_{NET}$ and the net moments $M_{NET}$ acting upon the aerial vehicle 110 are zero.

Figure 1D:
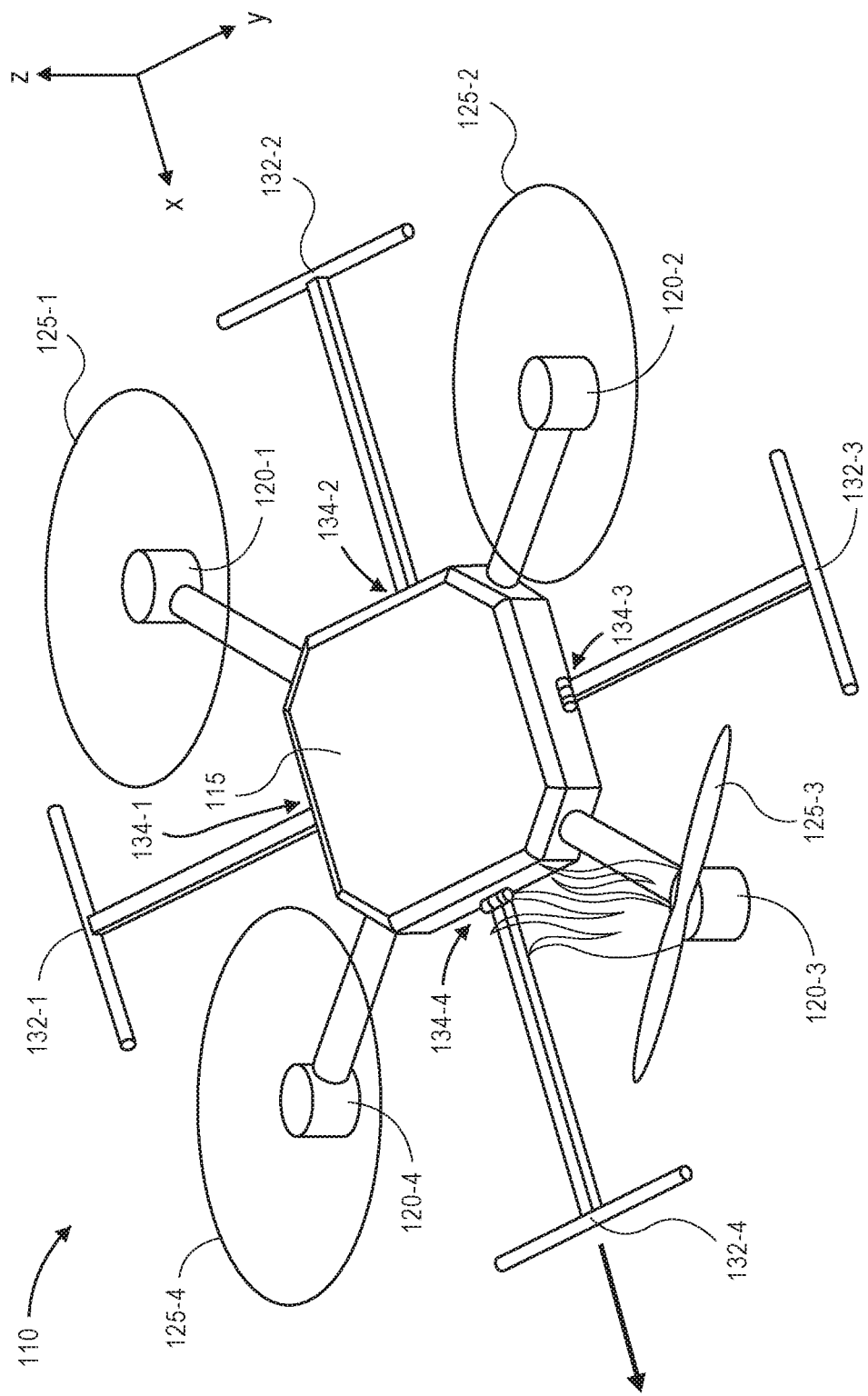
Figure 1E:
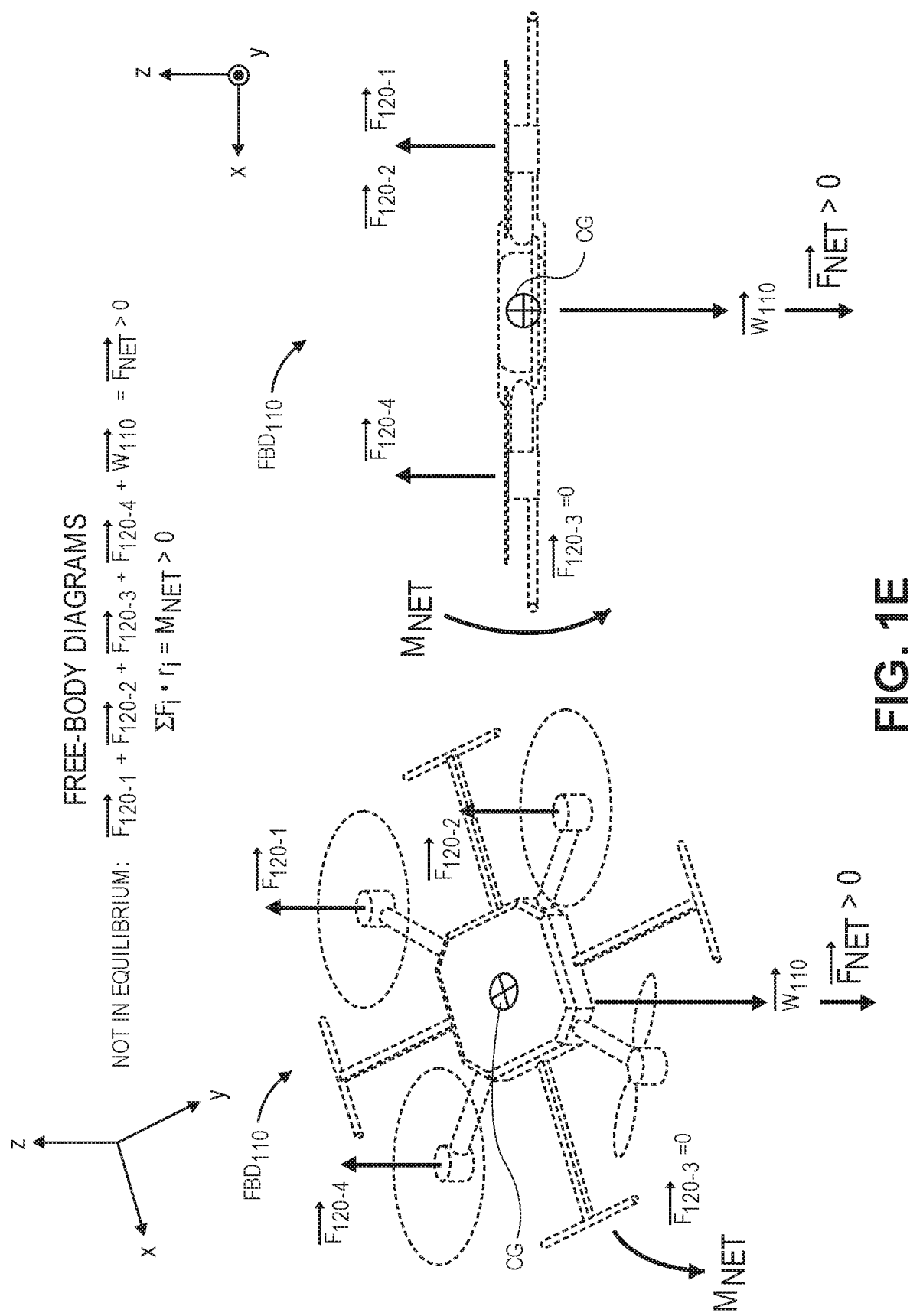

In accordance with the present disclosure, an aerial vehicle's attitude may be controlled by varying their respective physical attributes in a manner that reorients forces that are supplied to the aerial vehicle, e.g., by one or more propulsion motors, or forces that are imparted upon the aerial vehicle, such as thrust, lift, drag or weight. In some embodiments, the aerial vehicle may reconfigure one or more physical attributes in response to planned or unplanned variations in forces supplied to the aerial vehicle, or imparted upon the aerial vehicle, such as a fault in one or more propulsion motors. As is shown in FIGS. 1D and 1E, a loss of propulsion from the propulsion motor 120-3 results in a loss of the vertical force $F_{120-3}$, thereby taking the aerial vehicle 110 out of the equilibrium condition of FIG. 1C, and urging the aerial vehicle 110 to tip downward toward the ineffective propulsion motor 120-3. For example, as is shown in the free-body diagrams $FBD_{110}$ of FIG. 1E, the loss in the vertical force $F_{120-3}$ generated by the propulsion motor 120-3 results in a positive net force $F_{NET}$ in a downward direction, and a positive net moment $M_{NET}$ that urges the aerial vehicle 110 to rotate downward in a direction corresponding to the propulsion motor 120-3.

Figure 1F:
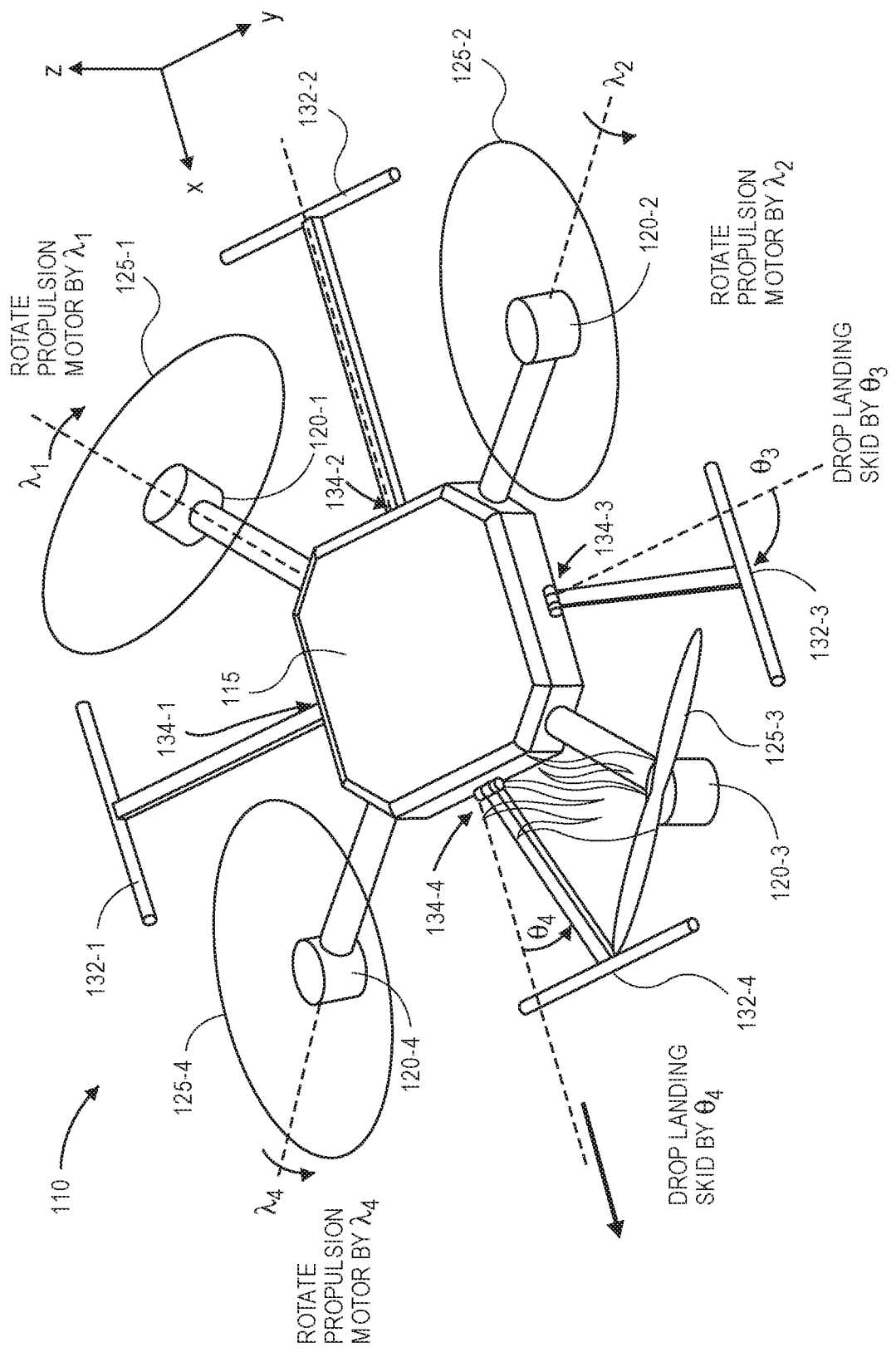

In response to having sensed the ineffectiveness of the propulsion motor 120-3, or changes to the operation or orientation of the aerial vehicle 110 resulting therefrom (e.g., angles of orientation and/or courses or speeds), one or more physical attributes of the aerial vehicle 110 may be modified to return the aerial vehicle 110 to an equilibrium condition and/or to orient the aerial vehicle 110 at a desired angular orientation. As is shown in FIG. 1F, the landing skids 132-3, 132-4 may be rotated downward about their respective motorized hinges 134-3, 134-4, e.g., to an extended state, by angles $\theta_3$, $\theta_4$, in order to compensate for changes in force resulting from the loss of propulsion from the propulsion motor 120-3. Alternatively, the landing skids 132-1, 132-2 may also be rotated downward about their respective motorized hinges 134-1, 134-2, to any desired angle. Additionally, one or more of the operable propulsion motors 120-1, 120-2, 120-4 may be rotated about their respective mounting axes by angles $\lambda_1$, $\lambda_2$, $\lambda_4$, in order to vary the propeller axes about which the propellers 125-1, 125-2, 125-4 are rotated, and the operating speeds of the operable propulsion motors 120-1, 120-2, 120-4 may be increased or decreased, as necessary, to thereby change the directions and/or the magnitudes of the forces generated by the operable propulsion motors 120-1, 120-2, 120-4, e.g., to compensate for changes in force resulting from the loss of propulsion from the propulsion motor 120-3.

Figure 1G:
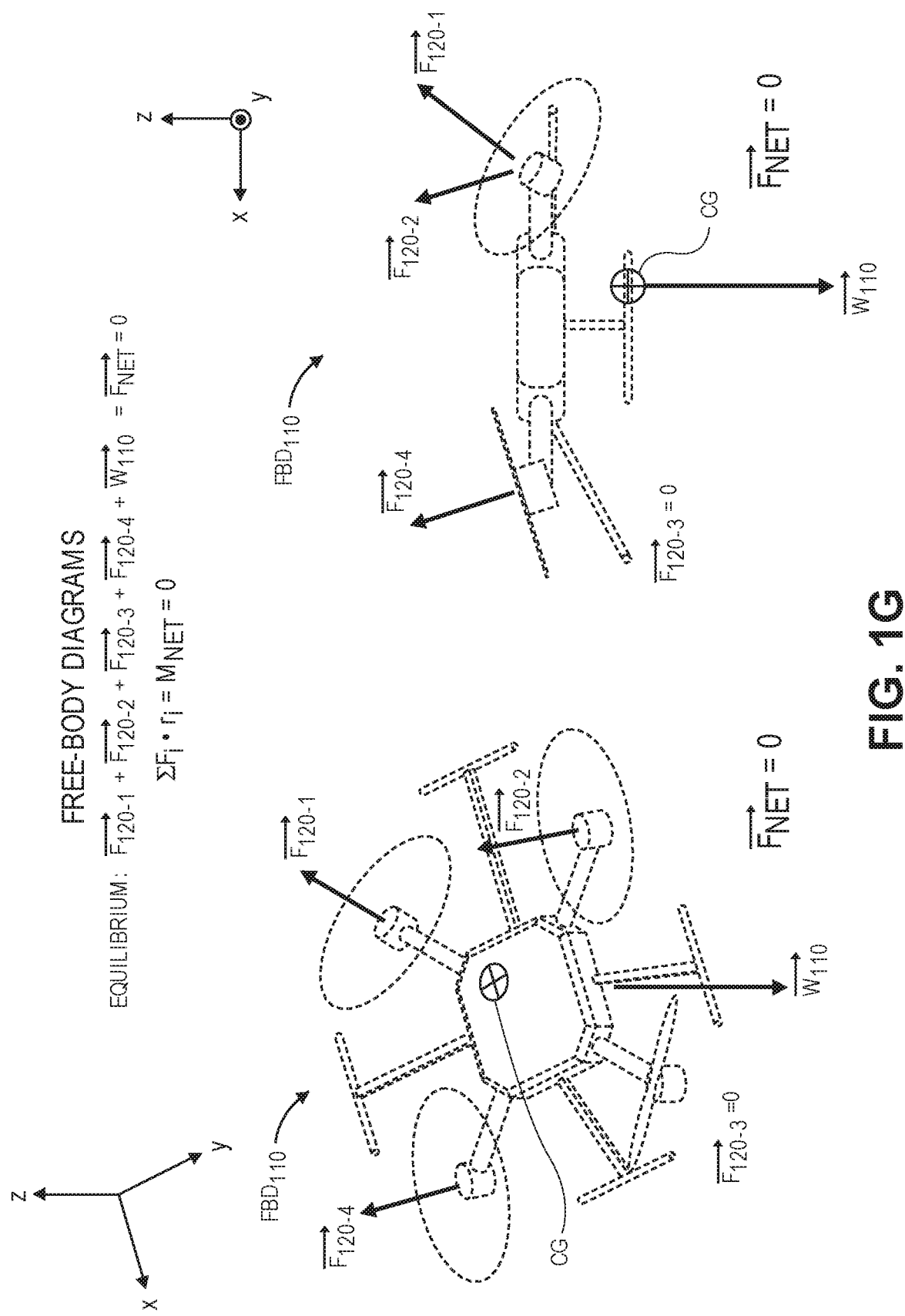

As is shown in the free-body diagrams $FBD_{110}$ of FIG. 1G, equilibrium of the aerial vehicle 110 may be restored by varying the angular orientations and/or operating speeds of the operable propulsion motors 120-1, 120-2, 120-4, and extending the landing skids 132-1, 132-2, 132-3, 132-4 to counteract the weight $w_{110}$ of the aerial vehicle 110, and the effects of the loss of the propulsion motor 120-3. For example, as is shown in FIG. 1G, by rotating the propulsion motors 120-2, 120-4 about their respective mounting axes toward the propulsion motor 120-3, and increasing their respective rotational speeds, as necessary, the forces $F_{120-2}$, $F_{120-4}$ counteract the loss of the vertical lift that had been generated by the propulsion motor 120-3. By rotating the propulsion motor 120-1 away from the propulsion motor 120-4 and increasing its rotational speed, as necessary, the force $F_{120-1}$ may counteract the lateral effects of the forces $F_{120-2}$, $F_{120-4}$ on the orientation of the aerial vehicle 110 while still providing sufficient vertical lift to the aerial vehicle 110. Additionally, by rotating the landing skids 132-3, 132-4 downward, the center of gravity CG of the aerial vehicle 110 is likewise lowered and transitioned away from the propulsion motor 120-3. Since the weight $w_{110}$ of the aerial vehicle 110 acts upon the center of gravity CG, the rotation of the landing skids 132-3, 132-4 causes the location where the weight $w_{110}$ is felt to be repositioned accordingly.

Accordingly, the systems and methods of the present disclosure are directed to controlling the attitude of an aerial vehicle, e.g., an unmanned aerial vehicle, by varying one or more physical attributes of the aerial vehicle, including but not limited to the orientations of one or more propulsion motors provided thereon, or the position in space of the aerial vehicle's center of gravity. In some embodiments, a propulsion motor may be mounted to an aerial vehicle by way of a repositionable mount that may reorient an axis of rotation of the propulsion motor (e.g., a propeller axis), and, therefore, redirect forces generated by the rotation of the propeller. The repositionable mount may be hinged, pivotable or otherwise reconfigurable in any manner. In some embodiments, the repositionable mounts may be operated by a servo motor or other apparatus that rotates a mast, a shaft, a stem, a boom or another extension by which the propulsion motor is mounted, thereby enabling an angular orientation to be controlled to a sufficiently fine degree. Where an aerial vehicle includes a plurality of propulsion motors, any number of the propulsion motors may be constructed in such a manner. Moreover, each of the propulsion motors may be independently controlled to direct forces in any desired direction or at any desired magnitude. Thus, when an aerial vehicle is configured with one or more propulsion motors that are repositionable according to one or more of the systems and methods disclosed herein, control of the aerial vehicle may be obtained without regard to a physical orientation of the aerial vehicle.

In some other embodiments, an aerial vehicle may be configured to relocate its center of gravity by repositioning one or more external appurtenances, thereby reconfiguring the positions of one or more movable objects with respect to a geometric center or one or more center lines of the aerial vehicle. Such appurtenances may be operated in a binary manner, e.g., placed in one of two defined positions, or may be operated between a range of positions, e.g., to any angular or linear extent within the range. In some embodiments, appurtenances that may be repositioned include, but are not limited to, one or more landing gear components (e.g., one or more landing skids, wheels, or other features). In other embodiments, such appurtenances may include, but are not limited to, one or more antennas or other components associated with the operation of the aerial vehicle.

In still other embodiments, an aerial vehicle may include a payload engagement system or apparatus that enables a position of an engaged payload to be repositioned, e.g., within a holding bay, in one or more directions with respect to a geometric center of the aerial vehicle, thereby enabling a center of gravity to be relocated based on a position of the engaged payload. The payload engagement system or apparatus may travel on one or more tracks, rails or other systems, or by any other means, and may be used to relocate the center of gravity in any direction, e.g., vertically, forward or aft, or laterally with respect to a geometric center or one or more center lines of the aerial vehicle. Alternatively, in some embodiments, systems for shifting locations of any objects (e.g., objects other than payloads) may be incorporated aboard an aerial vehicle. For example, a power source such as a battery or fuel cell may be repositioned with respect to a geometric center or one or more center lines of an aerial vehicle by one or more of such systems. Alternatively, a liquid may be pumped from one tank to another tank in order to shift locations of masses aboard an aerial vehicle, or an inflatable bladder may be installed in association with a movable object and be used to reposition the movable object in one or more locations with respect to a geometric center or center line of the aerial vehicle, e.g., by inflating or deflating the bladder and causing the movable object to move in one or more directions accordingly.

Therefore, the systems and methods of the present disclosure may be utilized to operate an aerial vehicle in a manner that is independent of its angular orientation, e.g., one or more of its yaw, pitch or roll angles. Whereas many existing aerial vehicles must be reoriented in their entirety in a direction where force (e.g., lift and/or thrust) is desired, an aerial vehicle that operates one or more of the systems and methods disclosed herein may generate force in any desired direction, and cause the aerial vehicle to travel at any desired velocity, in a manner that is independent of the aerial vehicle's orientation about yaw, pitch or roll axes. Additionally, and in accordance with the present disclosure, an aerial vehicle may be reoriented in any desired manner, about any axis (e.g., about a yaw axis, about a pitch axis and/or about a roll axis), while continuing to operate at a desired course, speed or altitude, by varying one or more physical attributes of the aerial vehicle. The courses, speeds, altitudes and/or orientations of the aerial vehicle may be defined in a transit plan having one or more discrete legs or paths extending between an origin and a destination, and through one or more intervening waypoints, or may be selected in real time or near-real time as may be required based on one or more operational and/or environmental conditions or requirements.

In some embodiments, the realignment or repositioning of one or more movable objects may be used to steer an aerial vehicle. For example, directions of forces generated by one or more propulsion motors installed aboard an aerial vehicle may be modified by changing an angular orientation of the aerial vehicle, thereby changing the alignments of the propeller axes of the respective propulsion motors, as desired. Accordingly, a desired location of a center of gravity that is required in order to change an angular orientation of an aerial vehicle may be determined, and one or more movable objects (e.g., landing gear components, antennas, engaged payloads) may be repositioned accordingly in order to place the center of gravity of the aerial vehicle at the desired location. For example, without varying alignments of any propulsion motors of an aerial vehicle, the aerial vehicle may be caused to lean to the left or to the right (e.g., to roll left or roll right) by moving an engaged payload to the left or to the right, respectively, with respect to a center line of the aerial vehicle. Thus, when a change in course of an aerial vehicle is desired, an engaged payload may be repositioned in the direction of the change, until a desired course is reached, and back again, e.g., as feedback, to stabilize the aerial vehicle on the desired course. Likewise, other adjustments to a location of a center of gravity of an aerial vehicle may be made by repositioning an engaged payload forward or aft, thereby causing the aerial vehicle to pitch downward or upward, respectively, enabling the aerial vehicle to change in altitude accordingly. Moreover, by retracting or extending one or more landing gear components, antennas or other appurtenances to desired positions, a location of a center of gravity may be similarly selected for any reason, including to achieve a desired change in course or altitude.

Maintaining control of the attitude of an aerial vehicle in accordance with the present disclosure is particularly useful where the aerial vehicle experiences one or more shocks, faults or other unexpected events, such as a loss of propulsion from one or more motors, a gust of wind, impact with a ground-based or airborne structure (e.g., another aerial vehicle) or any other operational occurrence or environmental event. For example, where an aerial vehicle senses an unanticipated change in orientation about one or more axes (e.g., yaw, pitch or roll), a loss in speed, altitude or control, or any other event (or symptoms thereof), the aerial vehicle may be configured to respond in kind by reorienting one or more propulsion motors (and/or increasing or decreasing their respective operating speeds), repositioning one or more movable objects (e.g., appurtenances or engaged payloads), or taking any other action with regard to the physical attributes of the aerial vehicle that enables the aerial vehicle to regain control, or to return to a desired orientation. In this regard, the systems and methods of the present disclosure are particularly useful during takeoff and landing operations of an aerial vehicle, or where an aerial vehicle is executing a rendezvous with another aerial vehicle, or in any other operational circumstance in which precise attitude control is imperative to the safe operation of the aerial vehicle, or in which forces of thrust or lift must be generated with precision (e.g., in both magnitude and direction) in response to forces of drag or weight. In some embodiments, one or more of the systems and methods disclosed herein may be utilized to respond to changes to wind flow or forces imparted thereby, or impacts with one or more other objects, in a faster and more efficient manner than according to traditional systems or methods. For example, an angle of attack of an aerial vehicle that is engaged in forward flight, or an operational velocity of the aerial vehicle may be selected or modified based on detected velocities of wind, or changes in such velocities, in order to ensure that the aerial vehicle remains in a desired orientation (e.g., yaw, pitch or roll angles) about its principal axes, or at a desired altitude or velocity in the presence of the wind. Likewise, an angle of attack of an aerial vehicle that collides with a ground-based or airborne object may be similarly selected or modified in response to such a collision.

Figure 2:
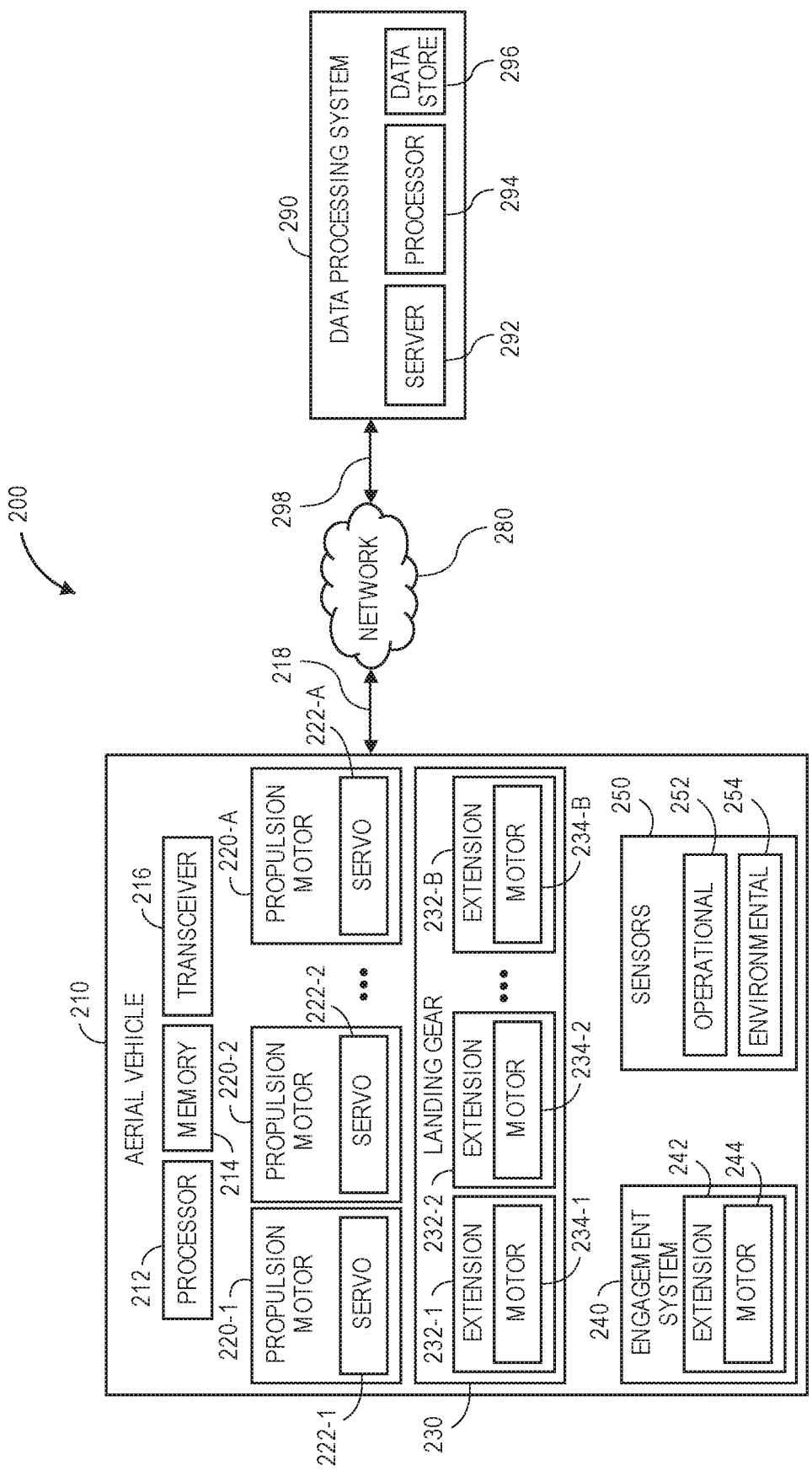
FIG. 2 is a block diagram of one system including an aerial vehicle configured for maintaining attitude control in accordance with embodiments of the present disclosure.

Referring to FIG. 2, a block diagram of one system 200 including an aerial vehicle 210 that is configured for maintaining attitude in accordance with embodiments of the present disclosure is shown. The system 200 of FIG. 2 includes the aerial vehicle 210 and a data processing system 290 that are connected to one another over a network 280, which may include the Internet, in whole or in part. Except where otherwise noted, reference numerals preceded by the number "2" shown in FIG. 2 indicate components or features that are similar to components or features having reference numerals preceded by the number "1" shown in FIGS. 1A through 1G.

As is shown in FIG. 2, the aerial vehicle 210 includes a processor 212, a memory 214 and a transceiver 216. The aerial vehicle 210 further includes a plurality of propulsion motors 220-1, 220-2 . . . 220-a, a set of landing gear 230, an engagement system 240 and a plurality of sensors 250.

The processor 212 may be configured to perform any type or form of computing function, including but not limited to the execution of one or more machine learning algorithms or techniques. For example, the processor 212 may control any aspects of the operation of the aerial vehicle 210 and the one or more computer-based components thereon, including but not limited to the propulsion motors 220-1, 220-2 . . . 220-a, the landing gear 230, the engagement system 240 or the sensors 250. In some embodiments, the processor 212 may control the operation of one or more control systems or modules for generating instructions for conducting operations of one or more of the propulsion motors 220-1, 220-2 . . . 220-a, the landing gear 230, the engagement system 240 or the sensors 250. For example, the processor 212 may be associated with one or more electronic speed controls, power supplies, navigation systems and/or payload engagement controllers for controlling the operation of the aerial vehicle 210 and for engaging with or releasing items, as desired.

For example, in some embodiments, the processor 212 may cause the propulsion motors 220-1, 220-2 . . . 220-a to operate at a predetermined or selected speed. The processor 212 may also cause one or more propellers mounted to such motors to rotate at a predetermined or selected pitch or configuration. The processor 212 may further cause the landing gear 230 to be extended or retracted, or reconfigured to a predetermined position or angle. The processor 212 may also cause the engagement system 240 to engage with or disengage from one or more objects, or to reposition such objects while they are engaged thereby. The processor 212 may further cause one or more of the sensors 250 to capture information or data, or interpret, process and/or store information or data captured thereby. In some embodiments, the processor 212 may also control the operation of one or more control surfaces (not shown), including but not limited to wings, rudders, ailerons, elevators, flaps, brakes, slats or other features. The processor 212 may further facilitate the communications between the propulsion motors 220-1, 220-2 . . . 220-a, the landing gear 230, the engagement system 240 or the sensors 250 and one or more control systems or modules may be associated with one or more other computing devices or machines and/or with the data processing system 290 or one or more other computer devices (not shown) over the network 280, through the sending and receiving of digital data.

Moreover, in some embodiments, the processor 212 may be configured to calculate the net effects of forces acting upon the aerial vehicle 210 (e.g., forces of thrust, lift, weight and drag), and to execute one or more calculations associated with the development of virtual free-body diagrams or other analytical tools for determining the net effects of the forces acting upon the aerial vehicle 210. For example, given the alignments of the respective propulsion motors 220-1, 220-2 . . . 220-a and their respective operating speeds, orientations and/or positions of one or more appurtenances (e.g., the landing gear 230, as well as one or more antennas), and positions of any engaged payloads with respect to the geometric centers of the aerial vehicle 210, as well as the locations of the center of gravity of the aerial vehicle 210, the processor 212 may determine one or more adjustments to such alignments, orientations and/or positions in order to generate desired forces in one or more directions, or to relocate the center of gravity of the aerial vehicle 210 to a desired location in space, and to operate the aerial vehicle 210 at a desired course, speed, altitude and/or orientation. Forces of thrust, lift, drag and/or weight may be compared with respect to one or more coordinate systems in three-dimensional space, e.g., by summing vectors corresponding to such forces with respect to a Cartesian coordinate system according to standard trigonometric functions, in order to determine the net effects of each of such forces, whether the aerial vehicle 210 is in equilibrium, or adjustments to be made to such forces in order to place the aerial vehicle 210 in equilibrium. In some embodiments, the processor 212 may receive information or data regarding one or more operational or environmental events, e.g., from one or more of the sensors 250, and determine or predict the impact of such events on the operation of the aerial vehicle 210. In still other embodiments, the processor 212 may select alignments and/or operating speeds of the propulsion motors 220-1, 220-2 . . . 220-a, orientations and/or positions of appurtenances, such as the landing gear 230, and/or positions of any engaged payload in order to generate forces in desired magnitudes and/or directions, or to place the center of gravity in a desired location in space, and to operate the aerial vehicle 210 at a desired course, speed, altitude and/or orientation.

The processor 212 may be a uniprocessor system including one processor, or a multiprocessor system including several processors (e.g., two, four, eight, or another suitable number), and may be capable of executing instructions. For example, in some embodiments, the processor 212 may be a general-purpose or embedded processor implementing any of a number of instruction set architectures (ISAs), such as the x86, PowerPC, SPARC, or MIPS ISAs, or any other suitable ISA. Where the processor 212 is a multiprocessor system, each of the processors within the multiprocessor system may operate the same ISA, or different ISAs.

Additionally, the aerial vehicle 210 further includes one or more memory or storage components 214 (such as databases or data stores) for storing any type of information or data, e.g., instructions for operating the aerial vehicle 210, or information or data captured during operations of the aerial vehicle 210. The memory 214 may be configured to store executable instructions, flight paths, flight control parameters and/or other data items accessible by or to the processor 212. The memory 214 may be implemented using any suitable memory technology, such as static random access memory (SRAM), synchronous dynamic RAM (SDRAM), nonvolatile/Flash-type memory, or any other type of memory. In some embodiments, program instructions, flight paths, flight control parameters and/or other data items may be received or sent via the transceiver 216, e.g., by transmission media or signals, such as electrical, electromagnetic, or digital signals, which may be conveyed via a communication medium such as a wired and/or a wireless link.

The transceiver 216 may be configured to enable the aerial vehicle 210 to communicate through one or more wired or wireless means, e.g., wired technologies such as Universal Serial Bus (or "USB") or fiber optic cable, or standard wireless protocols such as Bluetooth® or any Wireless Fidelity (or "Wi-Fi") protocol, such as over the network 280 or directly. The transceiver 216 may further include or be in communication with one or more input/output (or "I/O") interfaces, network interfaces and/or input/output devices, and may be configured to allow information or data to be exchanged between one or more of the components of the aerial vehicle 210, or to one or more other computer devices or systems (e.g., other aerial vehicles, not shown) via the network 280. For example, in some embodiments, the transceiver 216 may be configured to coordinate I/O traffic between the processor 212 and one or more onboard or external computer devices or components. The transceiver 216 may perform any necessary protocol, timing or other data transformations in order to convert data signals from a first format suitable for use by one component into a second format suitable for use by another component. In some embodiments, the transceiver 216 may include support for devices attached through various types of peripheral buses, e.g., variants of the Peripheral Component Interconnect (PCI) bus standard or the Universal Serial Bus (USB) standard. In some other embodiments, functions of the transceiver 216 may be split into two or more separate components, or integrated with the processor 212.

The propulsion motors 220-1, 220-2 . . . 220-*a* may be any type or form of motor (e.g., electric, gasoline-powered or any other motor) capable of generating sufficient rotational speeds of corresponding propellers or other components to provide lift and/or thrust forces to the aerial vehicle 210 and any payload engaged thereby, to aerially transport the engaged payload from one location to another. For example, one or more of the propulsion motors 220-1, 220-2 . . . 220-*a* may be a brushless direct current (DC) motor such as an outrunner brushless motor or an inrunner brushless motor.

The propulsion motors 220-1, 220-2 . . . 220-*a* may be of any kind, and may be dedicated to one or more purposes or functions. For example, one or more of the propulsion motors 220-1, 220-2 . . . 220-*a* may be aligned or configured to provide forces of lift to the aerial vehicle 210, exclusively, while one or more of the propulsion motors 220-1, 220-2 . . . 220-*a* may be aligned or configured to provide forces of thrust to the aerial vehicle 210, exclusively. Alternatively, one or more of the propulsion motors 220-1, 220-2 . . . 220-*a* may be aligned or configured to provide forces of lift and/or forces of thrust to the aerial vehicle 210, as needed.

Each of the propulsion motors 220-1, 220-2 . . . 220-*a* is associated with a servo motor 222-1, 222-2 . . . 222-*a* for reorienting or reconfiguring one of the propulsion motors 220-1, 220-2 . . . 220-*a* in a desired direction or angular orientation. For example, each of the servo motors 222-1, 222-2 . . . 222-*a* may be configured to rotate one of the propulsion motors 220-1, 220-2 . . . 220-*a* about one or more axes, e.g., to a desired angular orientation or position. The servo motors 222-1, 222-2 . . . 222-*a* may be powered by the same power sources that power the corresponding propulsion motors 220-1, 220-2 . . . 220-*a*, or by one or more different or alternative power sources, and may be controlled by the processor 212, by one or more control systems or modules associated with the processor 212, or in any other manner.

Each of the propulsion motors 220-1, 220-2 . . . 220-*a* may be joined to one or more propellers (e.g., rotors or rotatable systems) having a plurality of shaped blades joined to a hub or boss. Accordingly, the operation of one or more of the servo motors 222-1, 222-2 . . . 222-*a* may cause a corresponding axis of rotation (e.g., a propeller axis) of one or more of the propulsion motors 220-1, 220-2 . . . 220-*a*, and of one or more propellers mounted thereto, to be modified accordingly. Each of such propellers may be rotatably mounted to a mast or shaft associated with a corresponding one of the propulsion motors 220-1, 220-2 . . . 220-*a* and configured to generate forces when rotated within a fluid. Each of such propellers include any number of blades, and may be fixed pitch, adjustable pitch or variable pitch in nature. Moreover, one or more of the propellers may be banded or shielded in any manner. In some embodiments, one or more of the propellers may be configured to rotate with a propeller axis aligned substantially vertically, and to provide forces in a vertical direction (e.g., upward) accordingly. In some other embodiments, one or more of the propellers may be configured to rotate with a propeller axis aligned substantially horizontally, and to provide forces in a horizontal direction (e.g., forward and/or lateral) accordingly. In still other embodiments, one or more of the propellers may be configured to rotate with propeller axes that are neither horizontal nor vertical, and to provide forces in directions corresponding to such propeller axes accordingly.

The engagement system 240 may be configured to engage and disengage one or more objects and/or containers holding such objects. The engagement system 240 includes an extension 242 for directly engaging with one or more objects (e.g., commercial items), and a motor 244 for repositioning the extension 242 in one or more directions (e.g., vertically, forward or aft, or laterally). The extension 242 may include one or more features for automatically engaging with or disengaging from one or more objects, including but not limited to one or more arms, grips, claws, suction apparatuses or other features. In some embodiments, the engagement system 240 is positioned within a cavity of a frame of the aerial vehicle 210 that may be formed by intersections of one or more rigid members, and may include one or more doors (not shown) or other features for opening or closing such cavity during operation. In some other embodiments, the engagement system 240 may be positioned external to the frame of the aerial vehicle 210, i.e., beneath the aerial vehicle 210. The engagement system 240 may be of any size sufficient to securely engage and disengage one or more objects or containers thereof. In other embodiments, the engagement system 240 may operate as a container for objects, and may secure the objects that are to be delivered in place therein. The engagement system 240 may be powered by the same power sources that power one or more of the propulsion motors 220-1, 220-2 . . . 220-*a*, or by one or more different or alternative power sources, and may be controlled by the processor 212, by one or more control systems or modules associated with the processor 212, or in any other manner.

The sensors 250 may include one or more operational sensors 252 and/or environmental sensors 254 having any components or features for determining one or more attributes of the aerial vehicle 210 during operation, or in an environment in which the aerial vehicle 210 is operating, or may be expected to operate, including extrinsic information or data or intrinsic information or data. In some embodiments, the operational sensors 252 may include one or more Global Positioning System ("GPS") receivers or sensors, compasses, speedometers, altimeters, clinometers (or other angle sensors), thermometers, barometers, hygrometers, gyroscopes, anemometers, tachometers, current sensors, voltage sensors, resistance sensors or any other type or form of sensor. In some embodiments, the environmental sensors 254 may include one or more air monitoring sensors (e.g., oxygen, ozone, hydrogen, carbon monoxide or carbon dioxide sensors), acoustic sensors (e.g., microphones, piezoelectric sensors, vibration sensors), infrared sensors, ozone monitors, pH sensors, magnetic anomaly detectors, metal detectors, radiation sensors (e.g., Geiger counters, neutron detectors, alpha detectors), attitude indicators, depth gauges, accelerometers or the like, as well as one or more imaging devices (e.g., digital cameras).

In some embodiments, one or more of the sensors 250 may be used to capture information or data regarding the aerial vehicle 210, or an environment in which the aerial vehicle 210 is operating, and such information or data may be used to control (or as a basis for controlling) the operation of one or more aspects of the aerial vehicle 210. For example, where one or more sensors determines that the aerial vehicle 210 is operating at a particular angle, speed, course or altitude, information or data regarding the angle, the speed, the course or the altitude may be interpreted by the processor 212 and used to generate one or more instructions for operating one or more of the propulsion motors 220-1, 220-2 . . . 220-*a*, the landing gear 230, the engagement system 240 or one or more other sensors 250, or any other aspect of the aerial vehicle 210, in a desired manner. Additionally, information or data captured by one or more of the sensors 250 may be captured and stored in one or more data stores, e.g., the memory 214, the data store 296 of the data processing system 290, or in one or more alternate or virtual locations, e.g., in a "cloud"-based environment.

In some embodiments, one or more of the sensors 250 may be used to capture information or data that, when interpreted, may indicate that one or more corrective actions may be required in order to maintain the aerial vehicle 210 on a desired course, at a desired speed, or in a desired angular orientation. For example, one or more of the sensors 250 may be or include a current sensor and/or a voltage sensor, and a fault in one of the propulsion motors 220-1, 220-2 . . . 220-*a* may be identified by determining an electric current flowing thereto or therefrom, or a voltage drop experienced thereby, which may indicate that the propulsion motor is experiencing a short circuit, an open circuit, or another electrical malady. Likewise, one or more of the sensors 250 may be or include a tachometer, and a fault in one of the propulsion motors 220-1, 220-2 . . . 220-*a* may be identified if the operating speed of the propulsion motor is above or below an expected operating speed. One or more of the sensors 250 may be or include a compass and/or a clinometer, and a fault in one of the propulsion motors 220-1, 220-2 . . . 220-*a* may be identified if the aerial vehicle 210 deviates from a desired course or angular orientation. One or more of the sensors 250 may be or include a thermometer or a temperature sensor, and a fault in one of the propulsion motors 220-1, 220-2 . . . 220-*a* may be identified if the aerial vehicle 210 experiences operating temperatures that are above or below a predetermined threshold. One or more of the sensors 250 may be or include an imaging device (e.g., a digital camera) or an acoustic sensor (e.g., a microphone, a piezoelectric sensor, a vibration sensor), and a fault in one of the propulsion motors 220-1, 220-2 . . . 220-*a* may be identified if imaging data or acoustic data captured from the propulsion motor indicates that the propulsion motor may be experiencing one or more abnormal conditions.

The data processing system 290 includes one or more physical computer servers 292 having one or more computer processors 294 and any number of data stores 296 (e.g., databases) associated therewith, as well as provided for any specific or general purpose. For example, the data processing system 290 of FIG. 2 may be independently provided for the exclusive purpose of receiving, analyzing or storing information regarding courses, speeds, altitudes or orientations of the aerial vehicle 210 during operation, as well as acoustic signals or energy, transit times or elapsed times associated with the transmission and receipt of such signals or energy, velocities (e.g., speeds or directions) or other information or data received from the aerial vehicle 210. Alternatively, the data processing system 290 may be provided in connection with one or more other physical or virtual services configured to receive, analyze or store such information or data, as well as one or more other functions. The servers 292 may be connected to or otherwise communicate with the processors 294 and the data stores 296, which may store any type of information or data, including but not limited to courses, speeds, altitudes or orientations, or information or data regarding environmental conditions, operational characteristics, or positions, for any purpose. The servers 292 and/or the computer processors 294 may also connect to or otherwise communicate with the network 280, as indicated by line 298, through the sending and receiving of digital data. For example, the data processing system 290 may include any facilities, stations or locations having the ability or capacity to receive and store information or data, such as media files, in one or more data stores, e.g., courses, speeds, altitudes or orientations, or related information or data received from the aerial vehicle 210, or from one another, or from one or more other external computer systems (not shown) via the network 280. In some embodiments, the data processing system 290 may be provided in a physical location. In other such embodiments, the data processing system 290 may be provided in one or more alternate or virtual locations, e.g., in a "cloud"-based environment. In still other embodiments, the data processing system 290 may be provided onboard one or more aerial vehicles, including but not limited to the aerial vehicle 210.

The network 280 may be any wired network, wireless network, or combination thereof, and may comprise the Internet in whole or in part. In addition, the network 280 may be a personal area network, local area network, wide area network, cable network, satellite network, cellular telephone network, or combination thereof. The network 280 may also be a publicly accessible network of linked networks, possibly operated by various distinct parties, such as the Internet. In some embodiments, the network 280 may be a private or semi-private network, such as a corporate or university intranet. The network 280 may include one or more wireless networks, such as a Global System for Mobile Communications (GSM) network, a Code Division Multiple Access (CDMA) network, a Long Term Evolution (LTE) network, or some other type of wireless network. Protocols and components for communicating via the Internet or any of the other aforementioned types of communication networks are well known to those skilled in the art of computer communications and thus, need not be described in more detail herein.

The computers, servers, devices and the like described herein have the necessary electronics, software, memory, storage, databases, firmware, logic/state machines, microprocessors, communication links, displays or other visual or audio user interfaces, printing devices, and any other input/output interfaces to provide any of the functions or services described herein and/or achieve the results described herein. Also, those of ordinary skill in the pertinent art will recognize that users of such computers, servers, devices and the like may operate a keyboard, keypad, mouse, stylus, touch screen, or other device (not shown) or method to interact with the computers, servers, devices and the like, or to "select" an item, link, node, hub or any other aspect of the present disclosure.

The aerial vehicle 210 and/or the data processing system 290 may use any web-enabled or Internet applications or features, or any other client-server applications or features including E-mail or other messaging techniques, to connect to the network 280, or to communicate with one another, such as through short or multimedia messaging service (SMS or MMS) text messages. For example, the aerial vehicle 210 may be adapted to transmit information or data in the form of synchronous or asynchronous messages to the data processing system 290 or to any other computer device (e.g., to one or more other aerial vehicles) in real time or in near-real time, or in one or more offline processes, via the network 280. Those of ordinary skill in the pertinent art would recognize that the aerial vehicle 210 or the data processing system 290 may operate or be operated by any of a number of computing devices that are capable of communicating over the network, including but not limited to set-top boxes, personal digital assistants, digital media players, web pads, laptop computers, desktop computers, electronic book readers, and the like. The protocols and components for providing communication between such devices are well known to those skilled in the art of computer communications and need not be described in more detail herein.

The data and/or computer executable instructions, programs, firmware, software and the like (also referred to herein as "computer executable" components) described herein may be stored on a computer-readable medium that is within or accessible by computers or computer components such as the processor 212 or the processor 294, or any other computers or control systems utilized by the aerial vehicle 210 or the data processing system 290 (e.g., by one or more other aerial vehicles), and having sequences of instructions which, when executed by a processor (e.g., a central processing unit, or "CPU"), cause the processor to perform all or a portion of the functions, services and/or methods described herein. Such computer executable instructions, programs, software, and the like may be loaded into the memory of one or more computers using a drive mechanism associated with the computer readable medium, such as a floppy drive, CD-ROM drive, DVD-ROM drive, network interface, or the like, or via external connections.

Some embodiments of the systems and methods of the present disclosure may also be provided as a computer-executable program product including a non-transitory machine-readable storage medium having stored thereon instructions (in compressed or uncompressed form) that may be used to program a computer (or other electronic device) to perform processes or methods described herein. The machine-readable storage media of the present disclosure may include, but is not limited to, hard drives, floppy diskettes, optical disks, CD-ROMs, DVDs, ROMs, RAMs, erasable programmable ROMs ("EPROM"), electrically erasable programmable ROMs ("EEPROM"), flash memory, magnetic or optical cards, solid-state memory devices, or other types of media/machine-readable medium that may be suitable for storing electronic instructions. Further, embodiments may also be provided as a computer-executable program product that includes a transitory machine-readable signal (in compressed or uncompressed form). Examples of machine-readable signals, whether modulated using a carrier or not, may include, but are not limited to, signals that a computer system or machine hosting or running a computer program can be configured to access, or including signals that may be downloaded through the Internet or other networks.

The present disclosure references a number of computer-based functions or tasks that may be executed by one or more computer processors, systems or resources. In some implementations, each of such functions or tasks may be executed by processors associated with an aerial vehicle, e.g., the processor 212, which may independently act upon instructions generated by such processors upon executing such functions or tasks. In some other implementations, each of such functions or tasks may be executed by processors that are external to an aerial vehicle, e.g., the processor 294, such as in one or more other physical, alternate or virtual locations, e.g., in a "cloud"-based environment. In still other implementations, such functions or tasks may be executed in a distributed manner, such as by computer processors, systems or resources in two or more distributed locations. For example, some of such functions or tasks may be executed by processors associated with one or more aerial vehicles, while other functions or tasks may be executed by processors located in one or more other physical, alternate or virtual locations.

Figure 3:
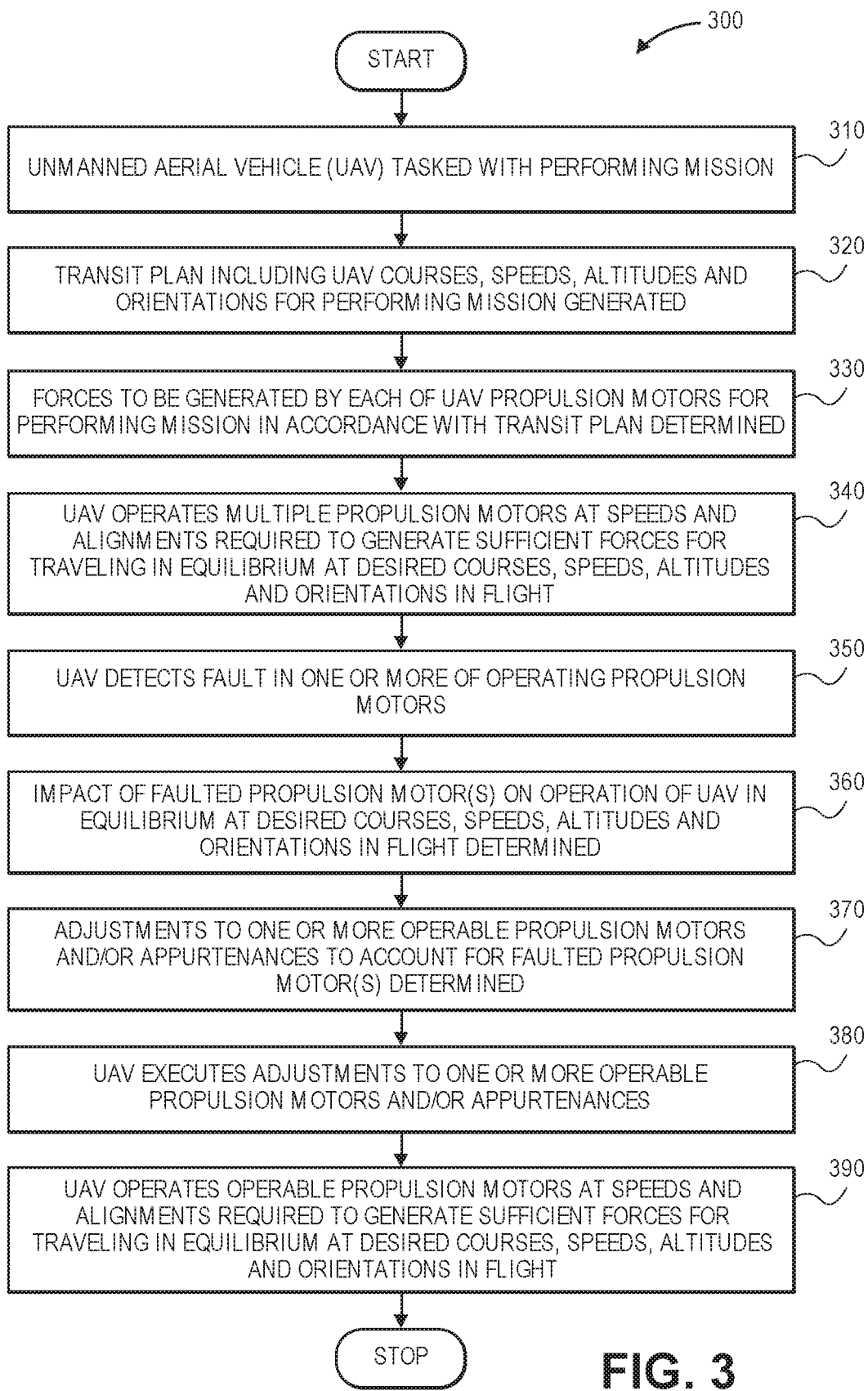
FIG. 3 is a flow chart of one process for maintaining attitude control of an aerial vehicle in accordance with embodiments of the present disclosure.

As is discussed above, an aerial vehicle may be configured to modify one or more physical attributes (e.g., positions or angles of orientation of one or more propulsion motors and/or other appurtenances, such as landing gear, antennas or the like) in order to maintain the aerial vehicle at a desired course, speed, altitude or orientation. In particular, the aerial vehicle may modify one or more of such attributes in response to information or data captured by one or more sensors, or upon determining one or more operational or environmental conditions associated with the operation of the aerial vehicle. Referring to FIG. 3, a flow chart 300 of one process for maintaining attitude control of an aerial vehicle is shown. At box 310, an unmanned aerial vehicle is tasked with performing a mission. The mission may be associated with surveillance, monitoring or delivery operations, or any other purpose. At box 320, a transit plan including a plurality of courses, speeds, altitudes and/or orientations for performing a mission is generated. The transit plan may include locations of an origin and a destination for the mission, as well as locations of one or more intervening waypoints, as well as courses for routes between the origin, the destination and/or the waypoints, or speeds, altitudes or orientations at which the aerial vehicle is to travel when performing the mission.

At box 330, forces that are to be generated by each of the propulsion motors of the UAV during the performance of the mission in accordance with the transit plan are determined. For example, the forces may be selected or determined in order to generate desired levels of force in any direction, as well as desired levels of lift, and to overcome forces of drag and weight that may be anticipated during the performance of the mission. The forces may be determined based on historical observations, forecasted conditions, or any other factor or requirement associated with the performance of the mission, or with one or more of the origin, the destination and/or any intervening waypoints. Such forces may be defined with regard to a single magnitude and a single direction, or with regard to magnitudes along directions corresponding to orthogonal axes (e.g., components along x-, y- and z-axes, or forward, lateral and/or vertical components), or in any other manner.

At box 340, the unmanned aerial vehicle operates multiple propulsion motors at operating speeds and alignments that are required to generate sufficient forces for traveling in equilibrium at desired courses, speeds, altitudes and orientations in flight during the performance of the mission. In accordance with the transit plan, the aerial vehicle may operate each of the propulsion motors provided aboard the aerial vehicles, or fewer than all of the propulsion motors, at any speed or orientation, and with one or more propeller blades that are provided at any pitch.

At box 350, the unmanned aerial vehicle detects a fault in one or more of the operating propulsion motors. For example, the fault may be detected based on a drop in operating speed (e.g., revolutions per minute falling below a threshold, as sensed by a tachometer or other system), a drop in current flowing to the propulsion motor, an increase in voltage drop or resistance across the propulsion motor, a change in angle of the aerial vehicle, a loss in speed or altitude, or on any other information or data, or based on any intrinsic or extrinsic factor. At box 360, the impact of the faulted propulsion motors on the operation of the unmanned aerial vehicle in equilibrium at the desired courses, speeds, altitudes and orientations in flight is determined. For example, any aspects of the one or more operating propulsion motors in which the fault is detected may be evaluated to determine a cause of the fault, whether the fault is temporary or permanent, or expected or unexpected, or whether a faulted propulsion motor may continue to operate in accordance with the transit plan. In some embodiments, changes in the net force that may be provided by a faulted propulsion motor, and whether the aerial vehicle may continue to operate in accordance with the transit plan with a faulted propulsion motor, or how to continue operation in accordance with the transit plan using operable propulsion motors other than the faulted propulsion motor, may be determined.

At box 370, adjustments to one or more of the remaining operable propulsion motors and/or appurtenances to account for the faulted propulsion motors are determined. For example, where each of the propulsion motors is to be aligned in a specific orientation or operated at a specific speed in order to operate the aerial vehicle in accordance with the transit plan, and one of the propulsion motors becomes unavailable for any reason, new orientations for the remaining propulsion motors may be determined in order to make up for the force that would have been provided by an unavailable propulsion motor. Moreover, where the loss of a propulsion motor would cause an unintended and/or undesirable variation in one or more of a yaw angle, a pitch angle or a roll angle, a relocation of the center of gravity of the aerial vehicle to compensate for the variation in the yaw angle, the pitch angle or the roll angle may be determined, and adjustments to the operation of any landing gear, antenna or other appurtenances of the aerial vehicle may be defined accordingly. Alternatively, where the aerial vehicle is carrying an engaged payload via an engagement system that is configured to reposition the engaged payload in any vertical or horizontal direction, a position of the engaged payload that causes the center of gravity to be relocated to a specific position in space may be determined.

At box 380, the unmanned aerial vehicle executes one or more of the adjustments to the operable propulsion motors and/or the appurtenances. The adjustments may involve one or more changes to the alignment and/or operating speeds of one or more operable propulsion motors, including but not limited to operating a secured propulsion motor or securing an operating propulsion motor, as well as changes to the alignment and/or position of one or more appurtenances such as landing gear, antennas or others. At box 390, the unmanned aerial vehicle operates the operable propulsion motors at speeds and alignments that are required to generate sufficient forces for traveling in equilibrium at the desired courses, speeds, altitudes and/or orientations in accordance with the transit plan, and the process ends.

In accordance with one or more embodiments of the present disclosure, attitude control of an aerial vehicle may be maintained during any aspect of the aerial vehicle's operations. In particular, the systems and methods disclosed herein may be used to exercise control of an aerial vehicle's attitude while generating sufficient forces of lift and/or thrust to overcome the forces of drag and weight, and enable the aerial vehicle to travel at any desired course, speed, altitude or orientation subject to limits imposed by the aerial vehicle's construction. For example, one or more of the systems and methods disclosed herein may be utilized to maintain attitude control of an aerial vehicle during takeoff and landing operations, where precise attitude control is imperative to the safe operation of the aerial vehicle, or in which forces of lift and/or thrust must be generated with precision (e.g., in both magnitude and direction) in response to forces of drag or weight, or various operational or environmental factors.

Referring to FIGS. 4A through 4D, views of aspects of an aerial vehicle 410 configured for maintaining attitude control in accordance with embodiments of the present disclosure are shown. Except where otherwise noted, reference numerals preceded by the number "4" shown in FIGS. 4A through 4D indicate components or features that are similar to components or features having reference numerals preceded by the number "2" shown in FIG. 2 or by the number "1" shown in FIGS. 1A through 1G.

As is shown in FIG. 4A, an unmanned aerial vehicle 410 is preparing for takeoff. The unmanned aerial vehicle 410 includes a plurality of propulsion motors 420-1, 420-2, 420-3, 420-4, as well as a plurality of landing skids 432-1, 432-2, 432-3, 432-4. Each of the propulsion motors 420-1, 420-2, 420-3, 420-4 is aligned to generate force in a substantially vertical direction, and each of the landing skids 432-1, 432-2, 432-3, 432-4 is fully extended, e.g., with the unmanned aerial vehicle 410 resting on a substantially flat surface, with a forward velocity $V_x$ of zero, and a vertical velocity $V_z$ increasing with the rotational speeds of the propulsion motors 420-1, 420-2, 420-3, 420-4. As is shown in FIG. 4B, the unmanned aerial vehicle 410 has lifted off from the substantially flat surface and is traveling aloft at a horizontal velocity $V_x$ of zero, and at a predetermined vertical velocity $V_z$ associated with takeoff operations. After having lifted from the substantially flat surface, each of the landing skids 432-1, 432-2, 432-3, 432-4 has been fully retracted, e.g., to a flight position, resulting in a center of gravity that is substantially located at a geometric center of the aerial vehicle 410.

Figure 4C:
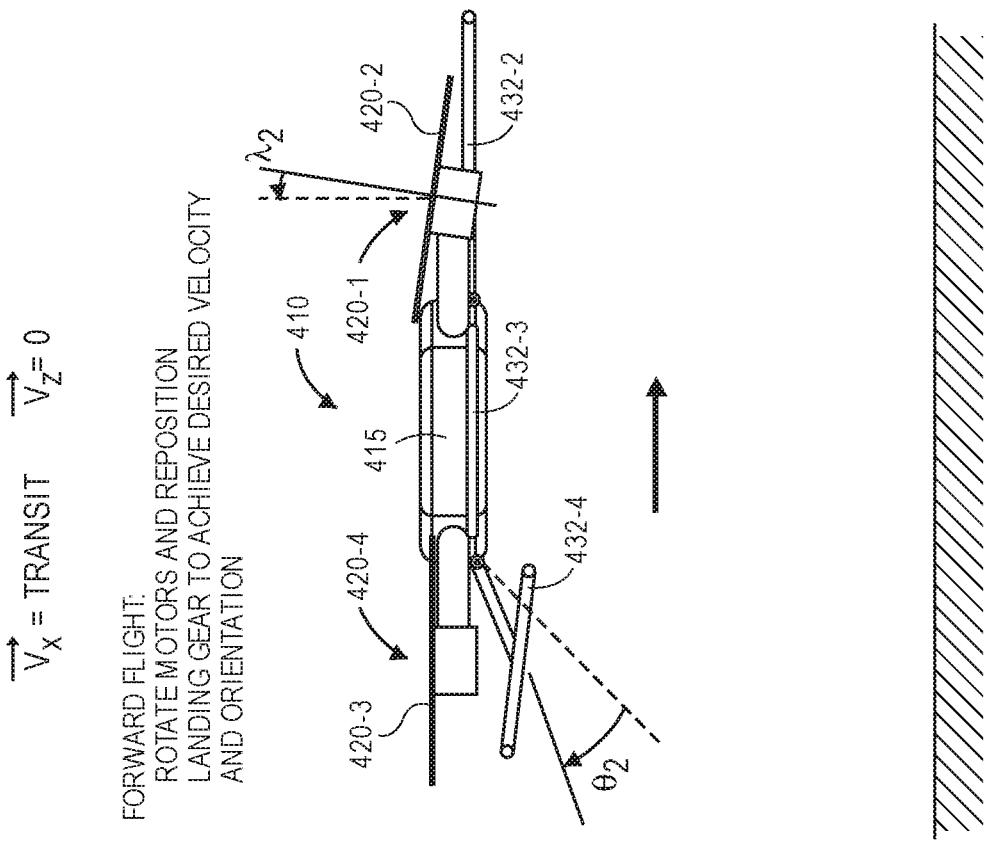

As is shown in FIG. 4C, the aerial vehicle 410 has reached a desired altitude, and begins a transition to forward flight. In this regard, the propulsion motors 420-1, 420-2 are tilted forward to an alignment at a predetermined angle $\lambda_1$, thereby generating thrust in a forward or lateral direction as a result of their operation, in addition to lift in a vertical direction. The propulsion motors 420-3, 420-4 remained aligned substantially vertically, and thereby generate vertical lift alone. As a result, the aerial vehicle 410 begins to increase in horizontal velocity $V_x$, and the vertical velocity $V_z$ begins to slow and approach zero.

Additionally, as is also shown in FIG. 4C, the landing skid 432-4 is lowered by an angle $\theta_1$, while the landing skids 432-1, 432-2, 432-3 are shown in a fully retracted position. The lowering of the landing skid 432-4 causes a substantial portion of the mass of the landing skid 432-4, e.g., the horizontal portion that comes into contact with landing surfaces, to be positioned well below a geometric center of the aerial vehicle 410, thereby offsetting the center of gravity vertically downward and in a forward direction. The offset of the center of gravity caused by the lowering of the landing skid 432-4 acts in concert with the rotation of the propulsion motors 420-1, 420-2, to counteract any downward urging of the aerial vehicle 410 resulting from the forces generated by the rotated propulsion motors 420-1, 420-2. The extent of the angle $\theta_1$ may be selected based on the amount of forward or lateral thrust or downward urging resulting from the rotation of the propulsion motors 420-1, 420-2, or on any other basis, including but not limited to the presence or absence of any wind flow (e.g., steady flow and/or gusts), or any other factors affecting thrust, lift, weight or drag on the aerial vehicle 410.

Figure 4D:
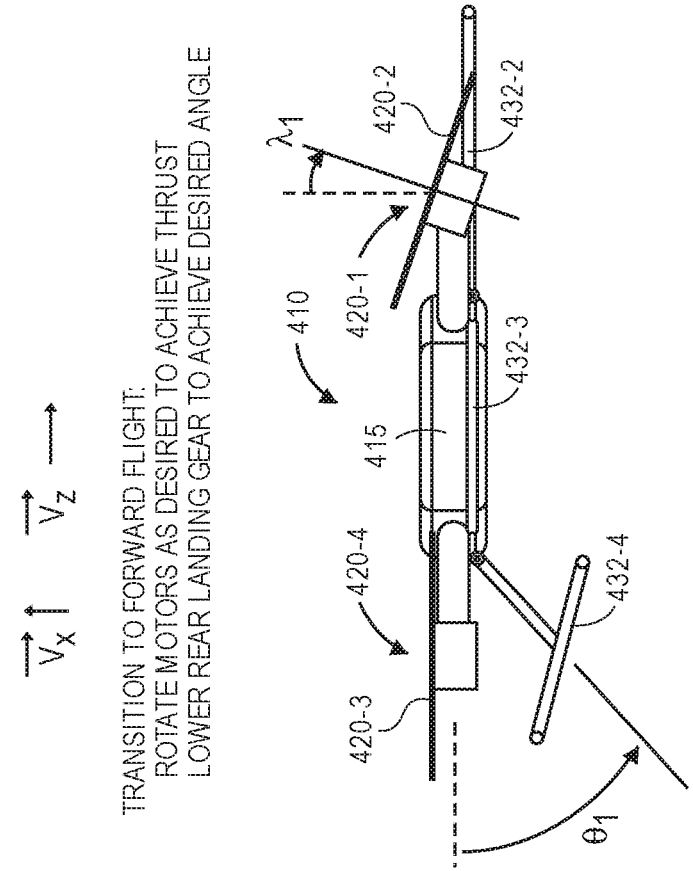

As is shown in FIG. 4D, as the aerial vehicle 410 has reached the desired altitude and transitioned to forward flight, the propulsion motors 420-1, 420-2 may be further repositioned to a predetermined angle $\lambda_2$, which is smaller than the angle $\lambda_1$. Likewise, the landing skid 432-4 may be repositioned to an angle $\theta_2$, which is smaller than the angle $\theta_1$. Because the aerial vehicle 410 has reached its desired velocity, the amount of forward or lateral thrust to be imparted upon the aerial vehicle 410 by the propulsion motors 420-1, 420-2, 420-3, 420-4 is smaller than the amount of forward or lateral thrust that was required to be imparted upon the aerial vehicle 410 in order to reach the desired velocity. Likewise, because the forward or lateral thrust generated by the propulsion motors 420-1, 420-2 aligned at the angle $\lambda_2$ is less than the forward or lateral thrust generated by the propulsion motors 420-1, 420-2 when aligned at the angle $\lambda_1$, the downward urging of the aerial vehicle 410 resulting from the forces generated by the rotated propulsion motors 420-1, 420-2 is less than when the propulsion motors 420-1, 420-2 are aligned at the angle $\lambda_2$. Therefore, the extension or angular orientation of the landing skid 432-4 may be reduced accordingly from the angle $\theta_1$ to the angle $\theta_2$.

Therefore, the systems and methods of the present disclosure may be utilized in connection with any operation of an aerial vehicle, such as is shown in FIGS. 4A through 4D, to maintain attitude control of the aerial vehicle while permitting the aerial vehicle to travel at desired courses, speeds, altitudes and orientations in flight. Different physical attributes may be modified separately or in concert with one another, and such modifications may be selected in order to ensure that the net effects of the modifications place the aerial vehicle 410 in equilibrium, and at a desired course, speed, altitude and/or orientation.

Figure 5A:
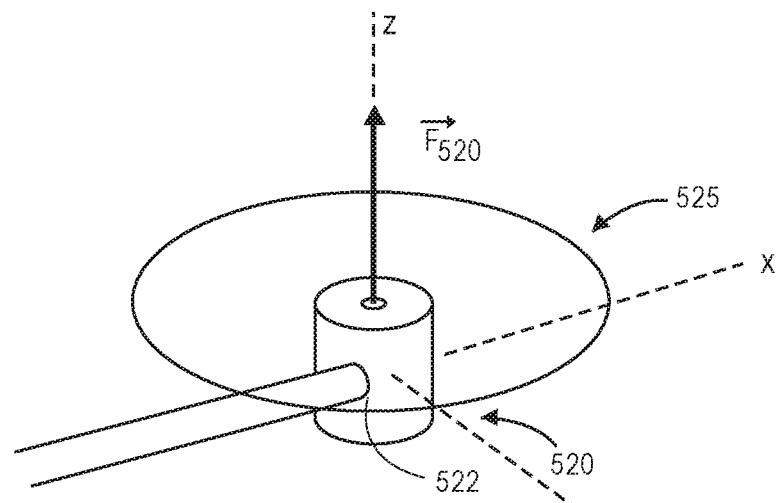
FIGS. 5A through 5C are views of aspects of an aerial vehicle configured for maintaining attitude control in accordance with embodiments of the present disclosure.
Figure 5B:
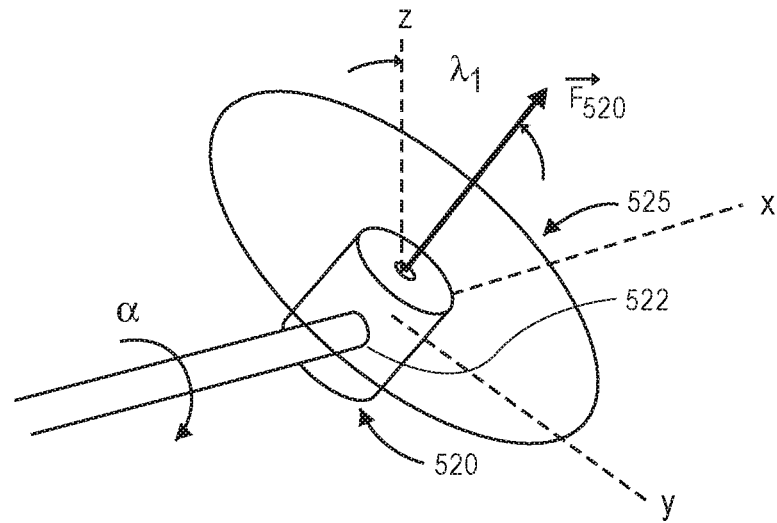
Figure 5C:
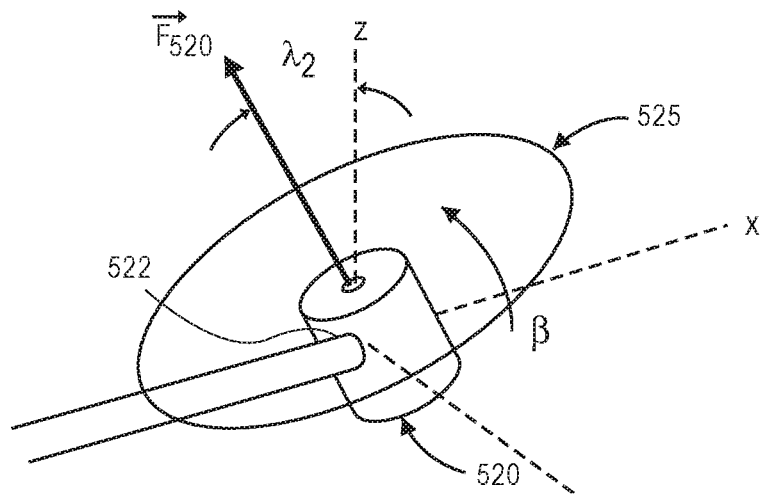

As is discussed above, in some embodiments, a propulsion motor may be mounted to an aerial vehicle by a repositionable mount that may reorient an axis of rotation of the propulsion motor (e.g., a propeller axis of the propulsion motor), and, therefore, redirect forces generated by the rotation of the propeller, as desired. Referring to FIGS. 5A through 5C, views of aspects of an aerial vehicle configured for maintaining attitude control in accordance with embodiments of the present disclosure are shown. Except where otherwise noted, reference numerals preceded by the number "5" shown in FIGS. 5A through 5C indicate components or features that are similar to components or features having reference numerals preceded by the number "4" shown in FIGS. 4A through 4D, by the number "2" shown in FIG. 2 or by the number "1" shown in FIGS. 1A through 1G.

As is shown in FIG. 5A, a propulsion motor 520 mounted to a frame of an aerial vehicle (not shown) includes a servo motor 522 and a propeller 525. The servo motor 522 may be configured to place an axis of rotation (e.g., a propeller axis) of the propulsion motor 520 in any alignment, e.g., with respect to a Cartesian coordinate system, thereby causing forces generated by the rotation of the propeller 525 to be directed along that axis. As is shown in FIG. 5A, the propulsion motor 520 is aligned substantially vertically, such that the propeller 525 rotates about a substantially vertical axis (e.g., about the z-axis, as shown in FIG. 5A), thereby generating a substantially vertical force $F_{520}$.

The servo motors 522 or other features by which propulsion motors may be mounted to aerial vehicle frames may be configured to reposition the propulsion motors in any direction, e.g., by rotating the propulsion motor 520 about an axis by which the propulsion motor is mounted (e.g., a mounting axis), such as the x-axis shown in FIG. 5A, or an axis transverse to the axis by which the propulsion motor is mounted, such as they-axis shown in FIG. 5A. For example, as is shown in FIG. 5B, the servo motor 522 may be configured to rotate the propulsion motor about the x-axis by an angle $\lambda_1$. Therefore, the net force generated by the propulsion motor 520 in the direction of the propeller axis by way of the rotation of the propeller 525, or $F_{520}$, may be considered to have component parts along the z-axis, e.g., vertical lift forces having a magnitude equal to a product of the force $F_{520}$ and a cosine of the angle $\lambda_1$, and also along the y-axis, e.g., lateral forces having a magnitude equal to a product of the force $F_{520}$ and a sine of the angle $\lambda_1$.

As is shown in FIG. 5C, the servo motor 522 may be configured to rotate the propulsion motor about the y-axis, e.g., about an axis perpendicular to the mounting axis, toward the aerial vehicle (not shown) by an angle $\lambda_2$. Therefore, the net force generated by the propulsion motor 520 in the direction of the propeller axis by way of the rotation of the propeller 525, or $F_{520}$, may be considered to have component parts along the z-axis, e.g., vertical lift forces having a magnitude equal to a product of the force $F_{520}$ and a cosine of the angle $\lambda_2$, and also along the x-axis, e.g., lateral forces having a magnitude equal to a product of the force $F_{520}$ and a sine of the angle $\lambda_2$. Component parts of the forces (e.g., forward forces, lateral forces, vertical forces) generated by each of the operating propulsion motors of an aerial vehicle may be combined with other forces of thrust, lift, drag or weight in order to determine a net force and/or moment acting on the aerial vehicle.

Figure 6C:
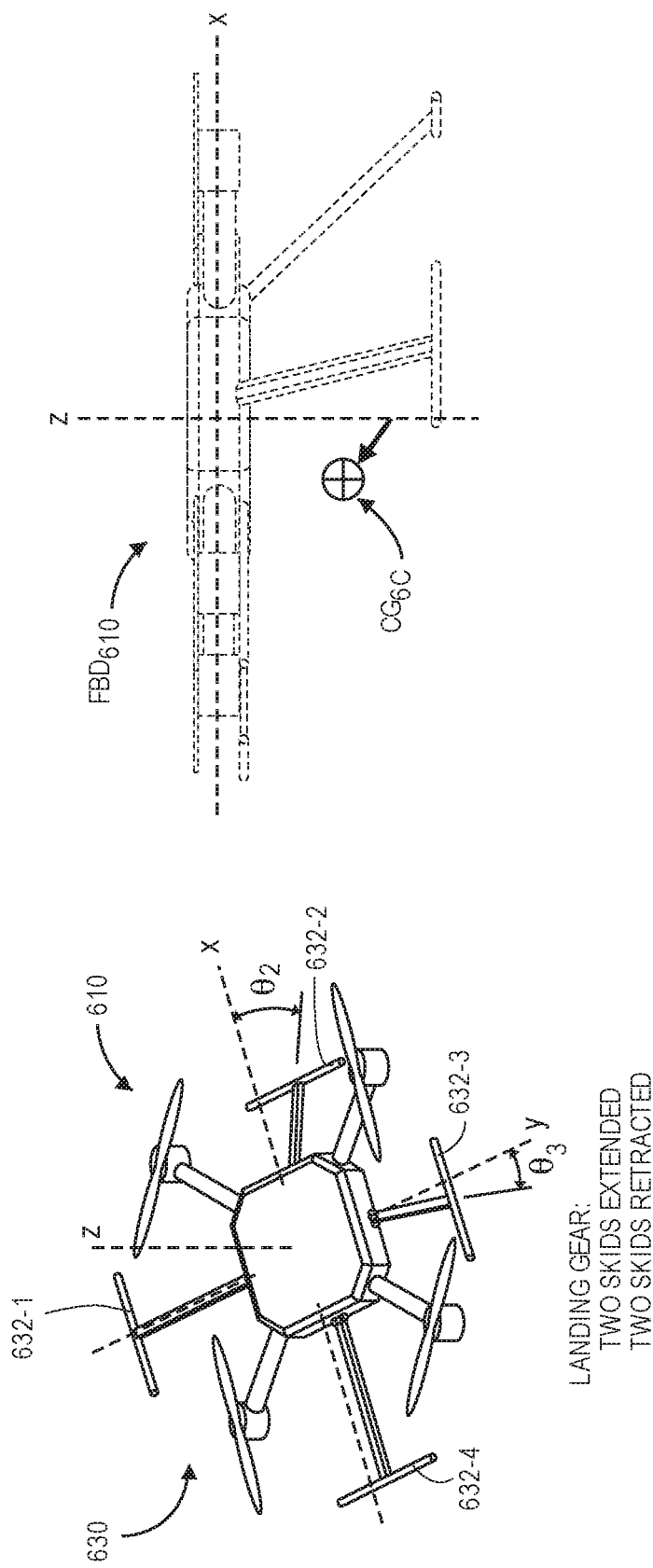

As is also discussed above, an aerial vehicle may be outfitted or equipped with one or more adjustable appurtenances (e.g., landing gear, antennas or other features) that may be realigned or repositioned in order to relocate masses of one or more discrete aspects of the aerial vehicle, thereby resulting in a relocation of a center of gravity of the aerial vehicle. Referring to FIGS. 6A through 6C, views of aspects of an aerial vehicle 610 configured for maintaining attitude control in accordance with embodiments of the present disclosure are shown. Except where otherwise noted, reference numerals preceded by the number "6" shown in FIGS. 6A through 6C indicate components or features that are similar to components or features having reference numerals preceded by the number "5" shown in FIGS. 5A through 5C, by the number "4" shown in FIGS. 4A through 4D, by the number "2" shown in FIG. 2 or by the number "1" shown in FIGS. 1A through 1G.

As is shown in FIG. 6A, the aerial vehicle 610 includes a set of landing gear 630, including a plurality of landing skids 632-1, 632-2, 632-3, 632-4. Each of the landing skids 632-1, 632-2, 632-3, 632-4 is shown in a retracted configuration, e.g., in a flight position, such as is shown in FIG. 4B. With the landing skids 632-1, 632-2, 632-3, 632-4 in the configuration shown in FIG. 6A, the center of gravity $CG_{6A}$ of the aerial vehicle 610 is located substantially around a geometric center of the aerial vehicle 610, such as is shown in the free-body diagram $FBD_{610}$ of FIG. 6A. The position of the center of gravity $CG_{6A}$ may be determined in any manner, such as by determining masses of discrete components of the aerial vehicle 610 and their distances from a centroid, a datum or another defined point, determining products of each of the masses and their respective distances, and dividing a sum of the products by a sum of the masses. Alternatively, the position of the center of gravity $CG_{6A}$ may be determined by any computer-based modeling techniques, or in any other manner.

Repositioning the landing skids, which feature concentrations of mass at their outer extremities, e.g., horizontal portions configured for contacting landing surfaces, results in a redistribution of the mass of the aerial vehicle 610 that may impact the location of its center of gravity. As is shown in FIG. 6B, when each of the landing skids 632-1, 632-2, 632-3, 632-4 is fully extended below the aerial vehicle 610 by angles $\theta_1$, $\theta_2$, $\theta_3$, $\theta_4$, respectively, e.g., in a landing configuration, the center of gravity $CG_{6B}$ of the aerial vehicle 610 likewise descends below the aerial vehicle 610, such as is shown in the free-body diagram $FBD_{610}$ of FIG. 6B.

The landing skids 632-1, 632-2, 632-3, 632-4 may be repositioned independently or in concert with one another, and to varying angles or positions. The center of gravity of the aerial vehicle 610 may be relocated, as necessary, and subject only to one or more operational limits or constraints, e.g., angular limitations on the extent of rotation of the landing skids 632-1, 632-2, 632-3, 632-4, or the lengths or masses of the respective landing skids 632-1, 632-2, 632-3, 632-4. As is shown in FIG. 6C, the landing skids 632-1, 632-4 are in a retracted configuration, and the landing skids 632-2, 632-3 are in a fully extended configuration, e.g., on either side of a vertical plane including the z-axis shown in FIG. 6C. Therefore, the masses of the landing skids 632-2, 632-3 are positioned well below the aerial vehicle 610, and the center of gravity $CG_{6C}$ of the aerial vehicle 610 is likewise below a horizontal plane that includes the x-axis, and to the left side of the vertical plane that includes the z-axis, such as is shown in the free-body diagram $FBD_{610}$ of FIG. 6C.

Figure 7A:
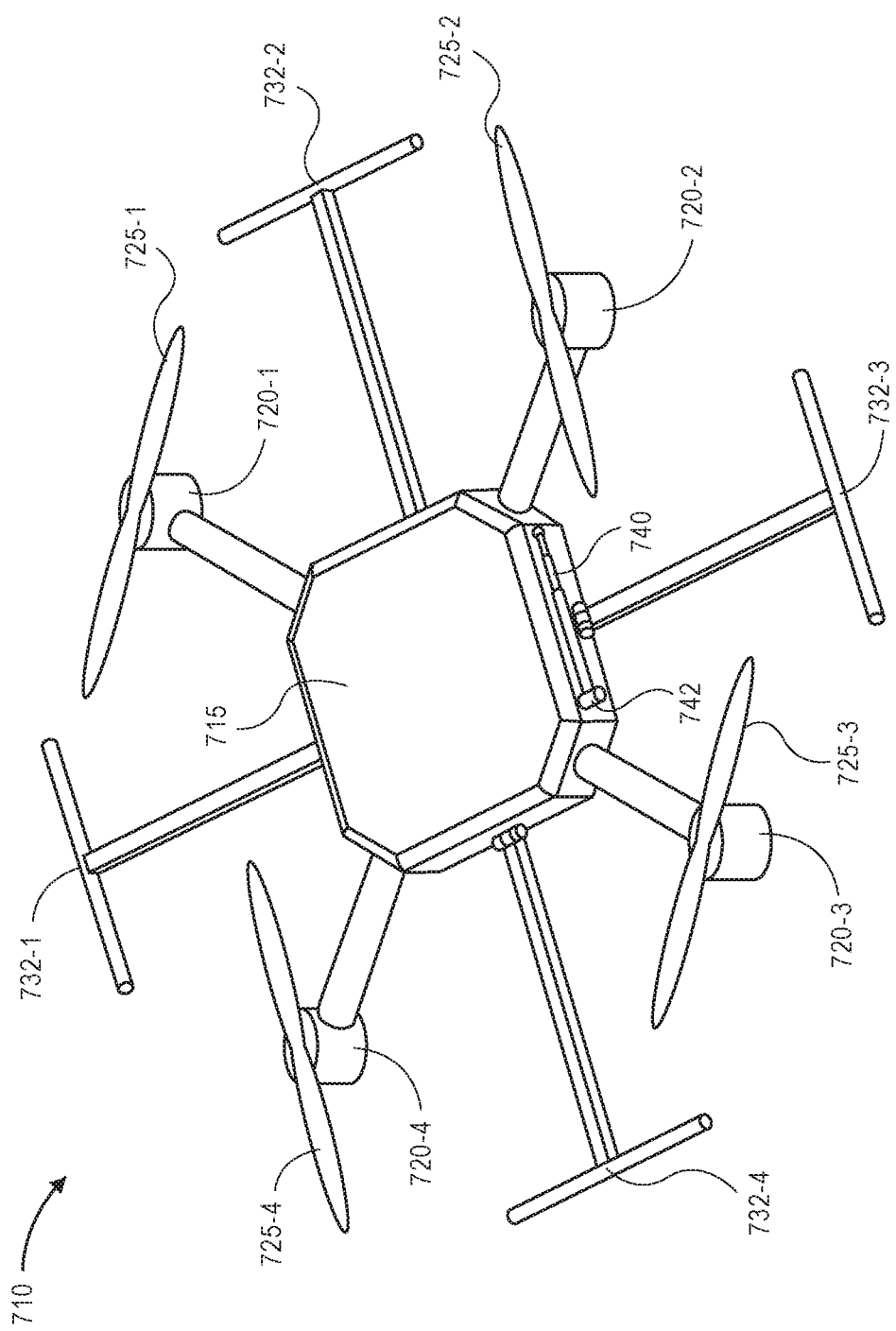

Referring to FIGS. 7A through 7C, views of aspects of an aerial vehicle 710 configured for maintaining attitude control in accordance with embodiments of the present disclosure are shown. Except where otherwise noted, reference numerals preceded by the number "7" shown in FIGS. 7A through 7C indicate components or features that are similar to components or features having reference numerals preceded by the number "6" shown in FIGS. 6A through 6C, by the number "5" shown in FIGS. 5A through 5C, by the number "4" shown in FIGS. 4A through 4D, by the number "2" shown in FIG. 2 or by the number "1" shown in FIGS. 1A through 1G.

As is shown in FIG. 7A, the aerial vehicle 710 includes a central console 715, a plurality of propulsion motors 720-1, 720-2, 720-3, 720-4 and a plurality of landing skids 732-1, 732-2, 732-3, 732-4. The aerial vehicle 710 further includes a telescoping antenna 740 that may be mounted to the central console 715 or other portion of a frame of the aerial vehicle 710 by a repositionable mount 742 that may rotate the antenna 740 and cause the antenna 740 to be extended or retracted.

As is shown in FIG. 7B, the antenna 740 is in a retracted state, e.g., folded adjacent to the central console 715. Therefore, the center of gravity $CG_{7B}$ of the aerial vehicle 710 is located substantially around a geometric center of the aerial vehicle 710, such as is shown in the free-body diagram $FBD_{710}$ of FIG. 7B.

As is shown in FIG. 7C, after the antenna 740 has been rotated about its mount and extended above the aerial vehicle 710, the center of gravity $CG_{7C}$ of the aerial vehicle is located substantially above the aerial vehicle 710, such as is shown in the free-body diagram $FBD_{710}$ of FIG. 7C. The distance to the center of gravity $CG_{7C}$ below the aerial vehicle 710 is defined as a function of a length to which the antenna 740 is extended, and a mass of the antenna 740, e.g., of one or more of the telescoping sections. Alternatively, the aerial vehicle 710 may be outfitted with one or more appurtenances that may extend below the aerial vehicle 710, or other appurtenances that may extend above the aerial vehicle 710 by any additional extent.

As is also discussed above, an aerial vehicle may be outfitted or equipped with one or more adjustable engagement systems that may be realigned or repositioned in order to relocate an engaged payload with respect to one or more axes, thereby resulting in a relocation of a center of gravity of the aerial vehicle. Referring to FIGS. 8A through 8D, views of aspects of an aerial vehicle 810 configured for maintaining attitude control in accordance with embodiments of the present disclosure are shown. Except where otherwise noted, reference numerals preceded by the number "8" shown in FIGS. 8A through 8D indicate components or features that are similar to components or features having reference numerals preceded by the number "7" shown in FIGS. 7A through 7C, by the number "6" shown in FIGS. 6A through 6C, by the number "5" shown in FIGS. 5A through 5C, by the number "4" shown in FIGS. 4A through 4D, by the number "2" shown in FIG. 2 or by the number "1" shown in FIGS. 1A through 1G.

As is shown in FIGS. 8A and 8B, the aerial vehicle 810 includes a central console 815, a plurality of propulsion motors 820-1, 820-2, 820-3, 820-4, a set of landing gear 830 and an engagement system 840. The engagement system 840 is located substantially centrally within the central console 815, and includes a pair of sliding doors 817 in an underside of the central console 815. The sliding doors 817 may be opened, such as is shown in the inset of FIG. 8A, in order to receive or release a payload, e.g., an item 80, or closed, such as is shown in FIG. 8B, after the payload has been received or released therefrom. Within the central console 815, the engagement system 840 includes an extension 842 that is equipped with one or more motors 844 and configured to travel along tracks 845 inside the central console 815. Alternatively, the engagement system 840 may include one or more rails, screws, belts, pulleys or other systems for causing the extension to move in one or more directions. The extension 842 is configured to include one or more features for automatically engaging with or disengaging from one or more objects, including but not limited to one or more arms, grips, claws, suction apparatuses or other features.

Therefore, in the embodiment of the aerial vehicle 810 shown in FIG. 8A, the extension 842 may travel forward and aft, e.g., along the x-axis, or left and right, e.g., along the y-axis, to shift a position of an engaged payload in any direction along such axes, and thereby relocate a center of gravity of the aerial vehicle 810 accordingly. Alternatively, in some embodiments, the engagement system 840 may include one or more other components (e.g., tension members or extension members, not shown) for repositioning an engaged payload in a vertical direction, e.g., along the z-axis, within the central console 815. In still other embodiments, the engagement system 840 may be mounted external to the central console 815, or in one or more other aspects or regions of the aerial vehicle 810, and may be configured to reposition any engaged payload in any direction, and to relocate a center of gravity of the aerial vehicle 810 accordingly.

Figure 8C:
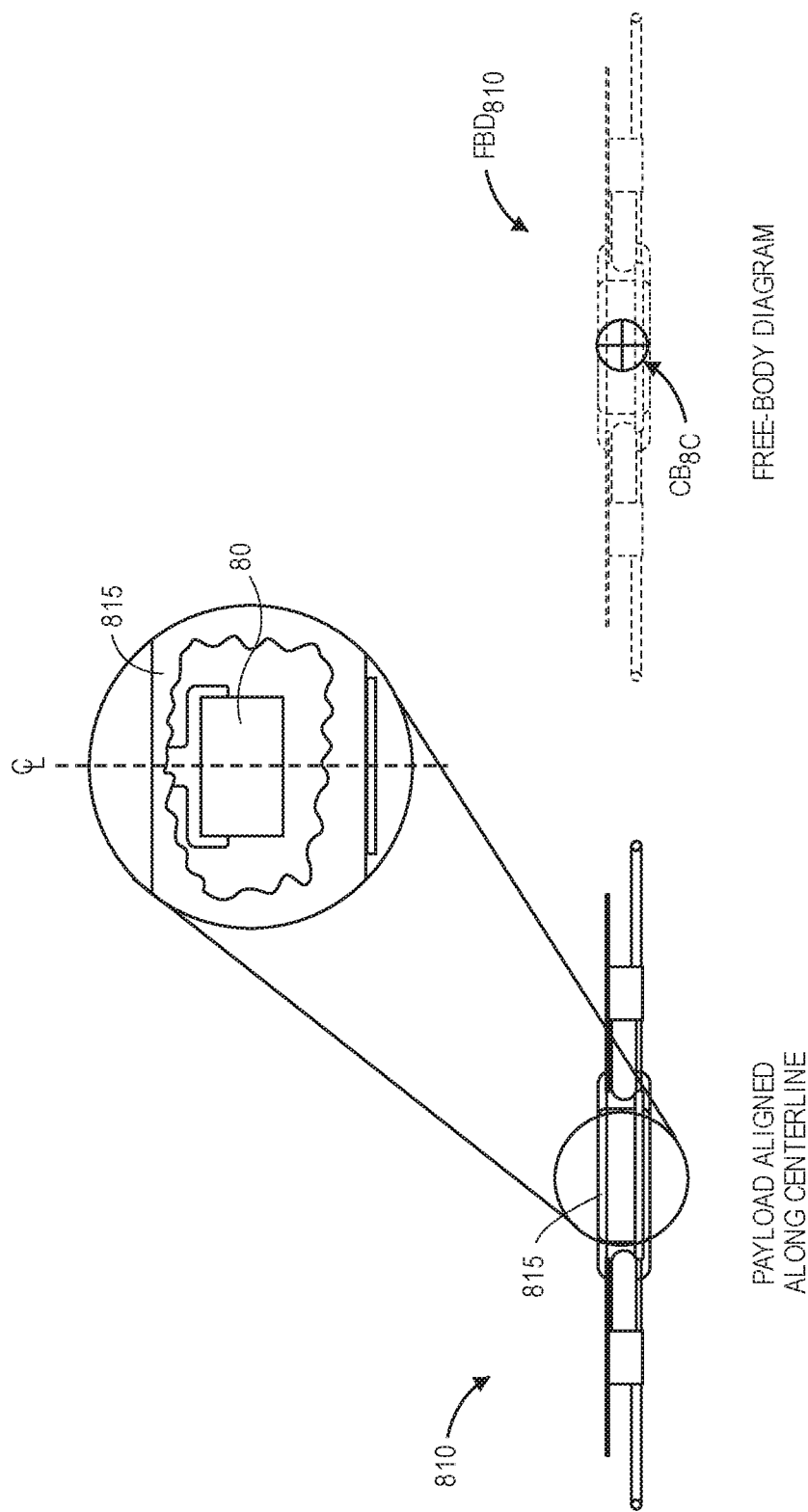
Figure 8D:
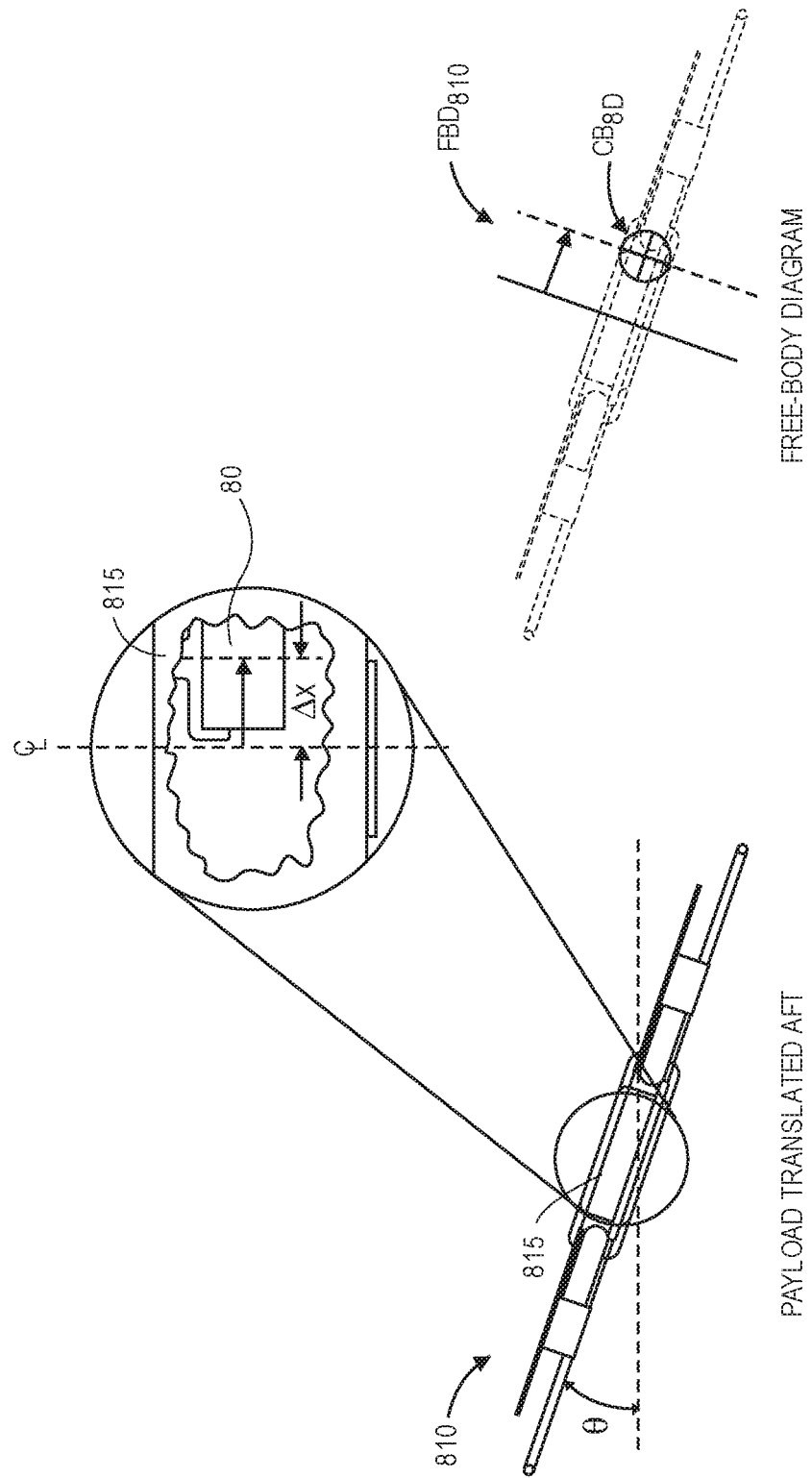

For example, as is shown in FIG. 8C, when the payload 80 is aligned substantially along a centerline of the aerial vehicle 810 within the central console 815 by the engagement system 840, a center of gravity $CG_{8C}$ of the aerial vehicle 810 is substantially located at a geometric center of the aerial vehicle 810, such as is shown in the free-body diagram $FBD_{810}$ of FIG. 8C. As is shown in FIG. 8D, when the payload 80 is translated aft by a distance $\Delta x$, the center of gravity $CG_{8D}$ of the aerial vehicle 810 likewise shifts aft, such as is shown in the free-body diagram $FBD_{810}$ of FIG. 8D, and a pitch angle $\theta$ is imparted upon the aerial vehicle 810 based on the shift in the center of gravity. In some embodiments, the payload 80 may be shifted in any direction, including not only aft but also forward, left, right, up or down, or one or more of such directions, thereby imparting pitch and/or roll angles on the aerial vehicle 810. In some embodiments, the extent of an angle imparted upon the aerial vehicle 810 by the change in the center of gravity may be selected based on the distance by which the payload is translated.

Figure 9:
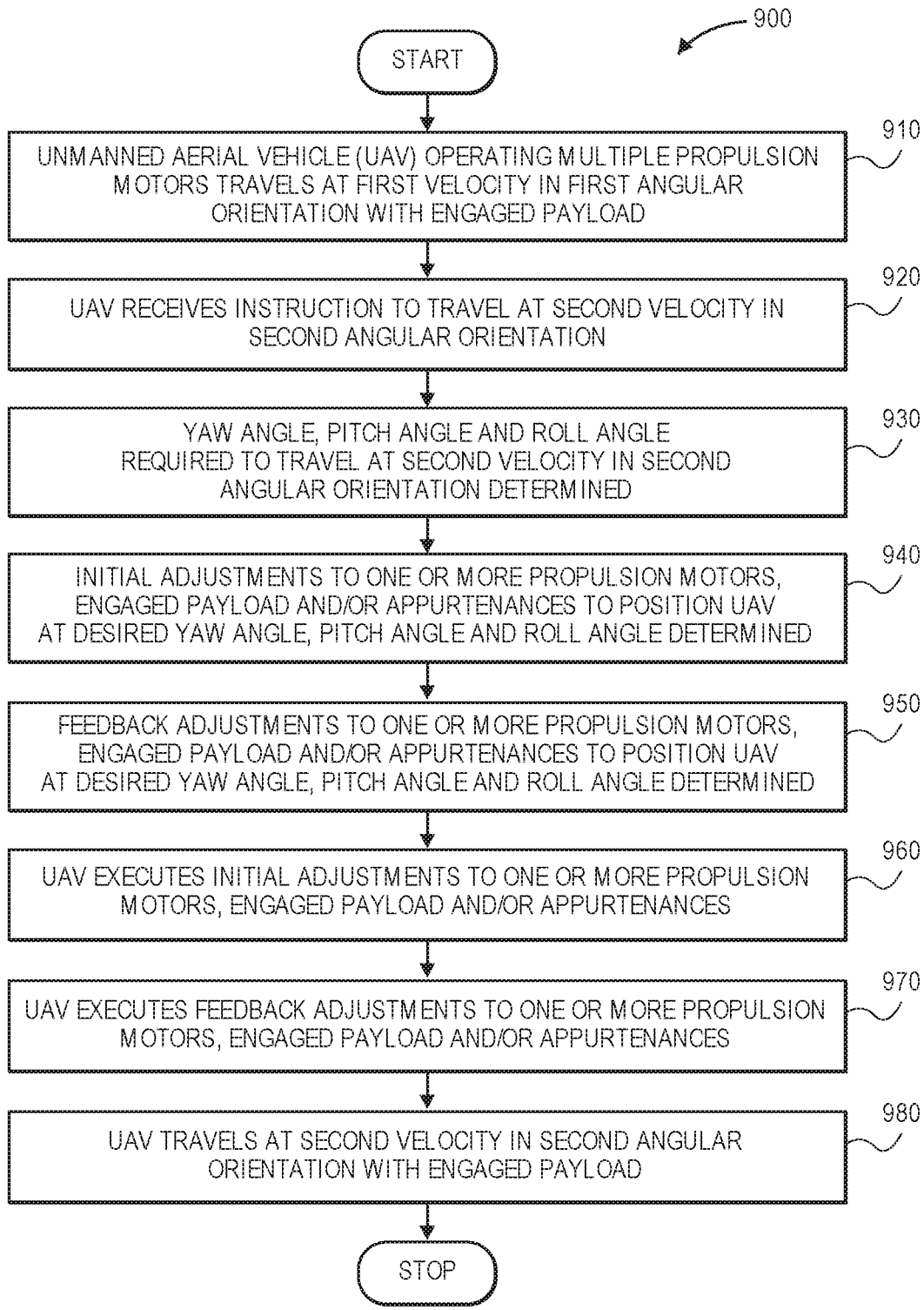
FIG. 9 is a flow chart of one process for operating an aerial vehicle having an ultrasonic anemometer in accordance with embodiments of the present disclosure.

Referring to FIG. 9, a flow chart 900 of one process for maintaining attitude control of an aerial vehicle is shown. At box 910, an unmanned aerial vehicle operating multiple propulsion motors is traveling at a first velocity in a first angular orientation with an engaged payload. The first velocity may be determined with respect to the ground or the air, or with respect to vertical and/or horizontal directions, or may be zero (e.g., the unmanned aerial vehicle may be in a hovering state). The first angular orientation may be flat, i.e., with yaw angles, pitch angles or roll angles of zero, or may be associated with any non-zero yaw angle, pitch angle or roll angle, as desired. The engaged payload may be any type of object, including but not limited to a consumer item. For example, the engaged payload may be a digital camera, an operational sensor, an environmental sensor or any other permanent or temporary fixture associated with the aerial vehicle.

At box 920, the unmanned aerial vehicle receives an instruction to travel at a second velocity in a second angular orientation. For example, the second velocity may involve an increase or decrease in speed, or a change in direction (e.g., either vertically or horizontally). At box 930, yaw angles, pitch angles and roll angles that are required in order to travel at the second velocity and in the second angular orientation are determined. Changes in the yaw angles, the pitch angles and/or the roll angles may result in not only different orientations of the aerial vehicle but also changes in the forces of thrust or lift imparted upon the aerial vehicle by the propulsion motors (e.g., fixed or repositionable motors), and the forces of drag acting upon the aerial vehicle during operation.

At box 940, initial adjustments to one or more propulsion motors, the engaged payload and/or one or more appurtenances that are required in order to cause the unmanned aerial vehicle to be positioned at the desired yaw angle, pitch angle and/or roll angle, or to operate at the second velocity, are determined. For example, such adjustments may include an increase or decrease in the operating speeds of one or more of the propulsion motors, or a change in the angular alignment of such propulsion motors (e.g., a vertical alignment, or a deviation from the vertical alignment, such as a rotation or bending about the mount). Additionally, such adjustments may include a change in the configuration of the engaged payload, including but not limited to a repositioning of the engaged payload within a cavity of the aerial vehicle, or with respect to one or more external surfaces of the aerial vehicle. Such adjustments may further include an extension or retraction, to any position or angle, of one or more landing gear (e.g., landing skids and/or wheels), antennas, or other external appurtenances of the aerial vehicle.

At box 950, feedback adjustments to the one or more propulsion motors, the engaged payload and/or appurtenances may, optionally, be determined. For example, in some instances, an initial adjustment to a propulsion motor, an engaged payload and/or one or more appurtenances may cause an aerial vehicle to change its course, speed, altitude and/or orientation, for at least a brief time, a feedback adjustment that reduces the lasting impact of the initial adjustment, and has a hysteresis effect on the aerial vehicle, may be determined. In some embodiments, the feedback adjustment may be an adjustment to an initial increase or decrease in a rotating speed of a propulsion motor, a reduction of an initial change in alignment of one or more of the propulsion motors, a modification to an initial repositioning of an engaged payload, or to an initial repositioning of one or more landing skids, antennas or other appurtenances. In other embodiments, the feedback adjustment may be a different adjustment to one or more of the propulsion motors, the engaged payload or the one or more appurtenances. For example, where an initial adjustment involves a change in operating speed and/or alignment of one or more propulsion motors, a feedback adjustment to overcome some of the effects of the initial adjustment may involve a change in position of an engaged payload and/or an appurtenance.

At box 960, the unmanned aerial vehicle executes one or more of the initial adjustments to the one or more propulsion motors, the engaged payload and/or the appurtenances. The initial adjustments may be executed in accordance with a predetermined transit plan, in accordance with the one or more instructions received at box 920, or at any other time. At box 970, optionally, the unmanned aerial vehicle executes one or more of the feedback adjustments, e.g., at a predetermined time, or at a time following the execution of the one or more initial adjustments. At box 980, after the initial adjustments and/or any feedback adjustments have been executed, the unmanned aerial vehicle travels at the second velocity in the second angular orientation with the engaged payload, and the process ends.

Figure 10:
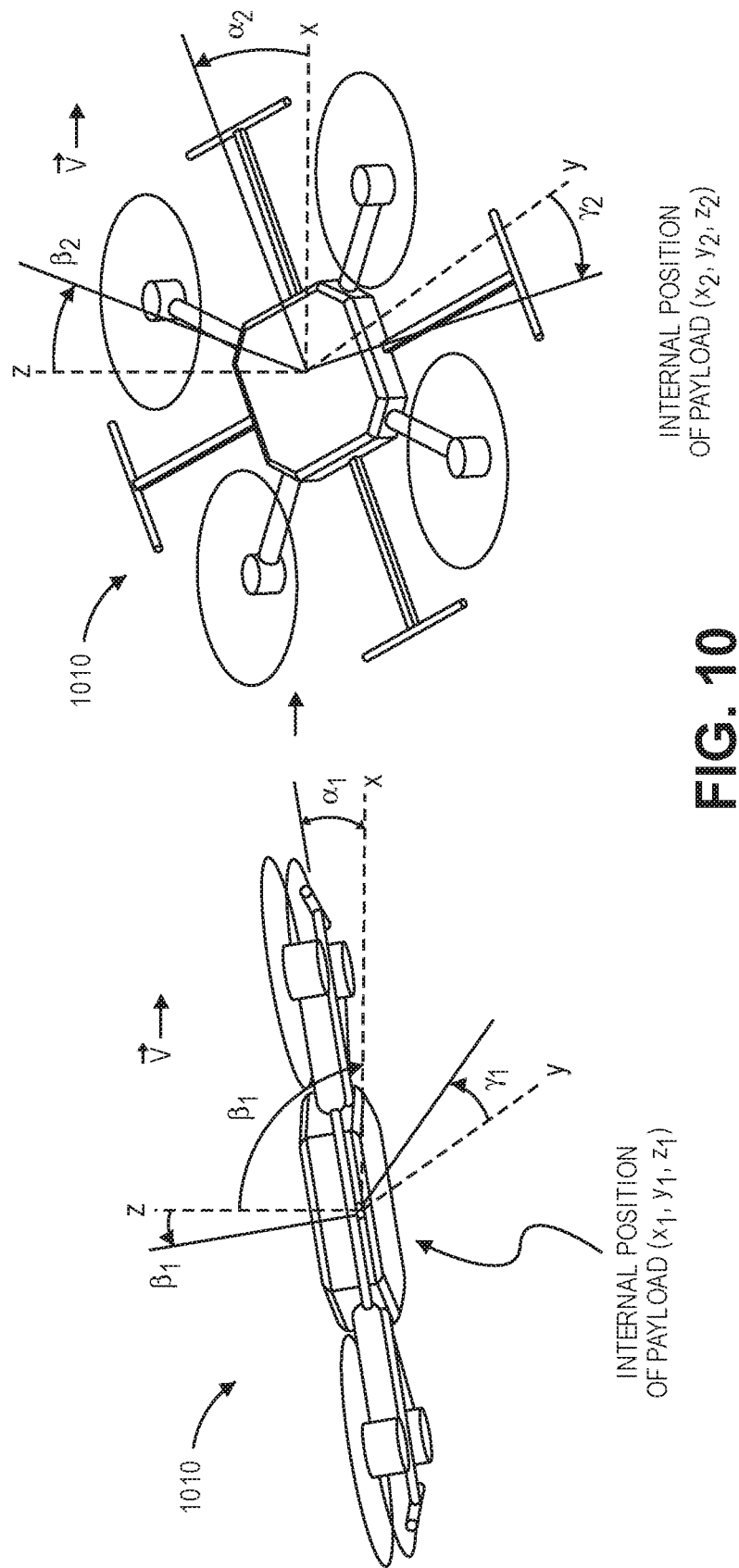
FIG. 10 is a view of an aerial vehicle configured for maintaining attitude control in accordance with embodiments of the present disclosure.

The systems and methods of the present disclosure enable yaw, pitch and/or roll angles of an aerial vehicle to be varied while the aerial vehicle is in motion at a desired course, speed or altitude, e.g., by varying one or more physical attributes of the aerial vehicle. Such physical attributes may include, but are not limited to, alignments and/or operating speeds of one or more propulsion motors, orientations or positions of one or more appurtenances (e.g., landing gear, antennas or other external features), or positions of engaged payloads. Variations to such attributes may be selected in a manner that causes the orientation of the aerial vehicle (e.g., the yaw, pitch and/or roll angle) to vary accordingly, while the aerial vehicle's course, speed and/or altitude remain unaffected. Referring to FIG. 10, a view of an aerial vehicle 1010 configured for maintaining attitude control in accordance with embodiments of the present disclosure is shown. Except where otherwise noted, reference numerals preceded by the number "10" shown in FIG. 10 indicate components or features that are similar to components or features having reference numerals preceded by the number "8" shown in FIGS. 8A through 8D, by the number "7" shown in FIGS. 7A through 7C, by the number "6" shown in FIGS. 6A through 6C, by the number "5" shown in FIGS. 5A through 5C, by the number "4" shown in FIGS. 4A through 4D, by the number "2" shown in FIG. 2 or by the number "1" shown in FIGS. 1A through 1G.

As is shown in FIG. 10, the aerial vehicle 1010 is operating at a constant velocity V, and is oriented at a yaw angle $\alpha_1$, a pitch angle $\beta_1$ and a roll angle $\gamma_1$. The velocity V may be selected in accordance with a transit plan or one or more operational requirements, and the aerial vehicle 1010 may be caused to travel at the velocity V by generating sufficient thrust in a forward direction to overcome the effects of drag and maintain the aerial vehicle 1010 on a predetermined course, speed and altitude. Additionally, subject to any operational constraints of the aerial vehicle 1010, the yaw angle $\alpha_1$, the pitch angle $\beta_1$ and the roll angle $\gamma_1$ may be selected and maintained, as necessary, by rotating or otherwise positioning one or more movable objects associated with the aerial vehicle 1010. For example, repositioning one or more of the propulsion motors (e.g., about one or more axes, such as a mounting axis) or changing their respective speeds, orienting or aligning landing gear (e.g., landing skids), antennas or other appurtenances, or positioning an engaged payload within the aerial vehicle 1010 all may have an effect on the angular orientation of the aerial vehicle 1010, as well as a course, speed and/or altitude of the aerial vehicle 1010. As is shown in FIG. 10, the aerial vehicle 1010 proceeds at the velocity V, and in the angular orientation defined by the yaw angle $\alpha_1$, the pitch angle $\beta_1$ and the roll angle $\gamma_1$, with the engaged payload in an internal position of $(x_1, y_1, z_1)$.

Subsequently, the orientation of the aerial vehicle 1010 may be modified, even as the velocity V remains constant, by further rotating or repositioning the propulsion motors, changing their speeds, reorienting any appurtenances or repositioning an engaged payload, as desired. Thus, as is shown in FIG. 10, adjustments to one or more of the physical attributes of the aerial vehicle 1010, such as by repositioning the engaged payload to an internal position of $(x_2, y_2, z_2)$, enable the aerial vehicle 1010 to be operated at the velocity V even where the yaw angle $\alpha_2$, the pitch angle $\beta_2$ and the roll angle $\gamma_2$ are modified, as necessary, e.g., to satisfy one or more operational requirements. Moreover, as is discussed above, varying a position of an engaged payload, or any other movable object, associated with an aerial vehicle may result in a change in a location of a center of gravity of the aerial vehicle, thereby causing a change in an angular orientation of the aerial vehicle. To the extent that the change in the angular orientation of the aerial vehicle results in different alignments of one or more propulsion motors operating thereon, such a change may further cause the aerial vehicle to change its course or altitude accordingly. Thus, in accordance with one or more embodiments of the present disclosure, positions of engaged payloads or other movable objects may be selected or modified, adjusted in order to implement one or more steering operations and/or evolutions, or to cause the aerial vehicle to travel on a desired course or at a desired altitude accordingly.

Although the disclosure has been described herein using exemplary techniques, components, and/or processes for implementing the systems and methods of the present disclosure, it should be understood by those skilled in the art that other techniques, components, and/or processes or other combinations and sequences of the techniques, components, and/or processes described herein may be used or performed that achieve the same function(s) and/or result(s) described herein and which are included within the scope of the present disclosure.

As used herein, the terms "forward" flight or "horizontal" flight refer to flight in a direction substantially parallel to the ground (i.e., sea level). As used herein, the term "vertical" flight refers to flight in a direction extending substantially radially outward from a center of the Earth. Those of ordinary skill in the pertinent arts will recognize that flight trajectories may include components of both "forward" flight or "horizontal" flight and "vertical" flight vectors.

Although some of the embodiments disclosed herein reference the use of unmanned aerial vehicles to deliver payloads from warehouses or other like facilities to customers, those of ordinary skill in the pertinent arts will recognize that the systems and methods disclosed herein are not so limited, and may be utilized in connection with any type or form of aerial vehicle (e.g., manned or unmanned) having fixed or rotating wings for any intended industrial, commercial, recreational or other use.

It should be understood that, unless otherwise explicitly or implicitly indicated herein, any of the features, characteristics, alternatives or modifications described regarding a particular embodiment herein may also be applied, used, or incorporated with any other embodiment described herein, and that the drawings and detailed description of the present disclosure are intended to cover all modifications, equivalents and alternatives to the various embodiments as defined by the appended claims. Moreover, with respect to the one or more methods or processes of the present disclosure described herein, including but not limited to the processes represented in the flow charts of FIG. 3 or 9, orders in which such methods or processes are presented are not intended to be construed as any limitation on the claimed inventions, and any number of the method or process steps or boxes described herein can be combined in any order and/or in parallel to implement the methods or processes described herein. Also, the drawings herein are not drawn to scale.

Conditional language, such as, among others, "can," "could," "might," or "may," unless specifically stated otherwise, or otherwise understood within the context as used, is generally intended to convey in a permissive manner that certain embodiments could include, or have the potential to include, but do not mandate or require, certain features, elements and/or steps. In a similar manner, terms such as "include," "including" and "includes" are generally intended to mean "including, but not limited to." Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y, or Z," or "at least one of X, Y and Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Language of degree used herein, such as the terms "about," "approximately," "generally," "nearly" or "substantially" as used herein, represent a value, amount, or characteristic close to the stated value, amount, or characteristic that still performs a desired function or achieves a desired result. For example, the terms "about," "approximately," "generally," "nearly" or "substantially" may refer to an amount that is within less than 10% of, within less than 5% of, within less than 1% of, within less than 0.1% of, and within less than 0.01% of the stated amount.

Although the invention has been described and illustrated with respect to illustrative embodiments thereof, the foregoing and various other additions and omissions may be made therein and thereto without departing from the spirit and scope of the present disclosure.

What is claimed is:

1. A method for operating an aerial vehicle, wherein the aerial vehicle comprises a first propulsion motor, a second propulsion motor, a third propulsion motor, a fourth propulsion motor and an engagement system configured to translate an engaged payload in at least one direction, and
   wherein the method comprises:
   causing the aerial vehicle to travel on a course at a speed and an altitude and in an angular orientation prior to a first time, wherein causing the aerial vehicle to travel on the course, at the speed and the altitude and in the angular orientation prior to the first time comprises:
      causing the first propulsion motor to operate at a first rotational speed prior to the first time;
      causing the second propulsion motor to operate at a second rotational speed prior to the first time;
      causing the third propulsion motor to operate at a third rotational speed prior to the first time;
      causing the fourth propulsion motor to operate at a fourth rotational speed prior to the first time; and
   causing the engagement system to place the engaged payload in a first position with respect to a centerline of the aerial vehicle;
   identifying a fault in the first propulsion motor as of the first time;
   causing the aerial vehicle to travel on the course at the speed and the altitude and in the angular orientation after the first time, wherein causing the aerial vehicle to travel on the course, at the speed and the altitude and in the angular orientation after the first time comprises:
      selecting a fifth rotational speed for the second propulsion motor based at least in part on the fault;
      selecting a sixth rotational speed for the third propulsion motor based at least in part on the fault;
      selecting a seventh rotational speed for the fourth propulsion motor based at least in part on the fault;
      selecting a second position for the engaged payload with respect to the centerline of the aerial vehicle;
      causing the second propulsion motor to operate at the fifth rotational speed after the first time;
      causing the third propulsion motor to operate at the sixth rotational speed after the first time;
      causing the fourth propulsion motor to operate at the seventh rotational speed after the first time; and
      causing the engaged payload to be translated to the second position after the first time.

2. The method of claim 1, wherein the first propulsion motor is aligned in a first alignment prior to the first time, and
   wherein the method further comprises:
      selecting a second alignment for the first propulsion motor based at least in part on the second position; and
      causing the first propulsion motor to be aligned in the second alignment after the first time.

3. The method of claim 1, wherein identifying the fault in the first propulsion motor comprises at least one of:
   determining an electric current flowing to or from the first propulsion motor at the first time;
   determining a voltage drop across the first propulsion motor at the first time;
   determining that the first propulsion motor is operating at less than the second operating speed at the first time;
   determining that the aerial vehicle is not traveling along the course at the speed at the first time;
   determining that the aerial vehicle is not operating in the angular orientation at the first time;
   determining that a temperature associated with the first propulsion motor exceeds a predetermined threshold;
   analyzing an image depicting at least a portion of the first propulsion motor, wherein the image was captured at approximately the first time; or
   analyzing acoustic energy emanating from the aerial vehicle, wherein the acoustic energy was captured at approximately the first time.

4. The method of claim 1, wherein the engagement system comprises at least one of a track, a rail, a screw-drive or a pulley within a cavity of the aerial vehicle, and
   wherein causing the engaged payload to be translated to the second position after the first time comprises:
      translating, by the at least one of the track, the rail, the screw-drive or the pulley, the at least one object from the first position to the second position.

5. A method comprising:
   selecting a first rotational speed for a first propulsion motor of an aerial vehicle and a second rotational speed for a second propulsion motor of the aerial vehicle for causing the aerial vehicle to travel on a first course, at a first velocity, at a first altitude and in a first angular orientation, wherein the aerial vehicle further comprises an engagement system configured to translate at least one object in at least one direction, wherein the first rotational speed and the second rotational speed are selected at a first time, and wherein the at least one object is in a first position at the first time;

operating the first propulsion motor at the first rotational speed;

operating the second propulsion motor at the second rotational speed;

selecting a third rotational speed for the second propulsion motor and a second position of the at least one object for causing the aerial vehicle to travel in the first angular orientation and at least one of on the first course, at the first velocity or at the first altitude, wherein the third rotational speed and the second position are selected at a second time, and wherein the second time follows the first time;

stopping the first propulsion motor;

operating the second propulsion motor at the third rotational speed; and causing the engagement system to move the at least one object from the first position to the second position.

6. The method of claim 5, further comprising:
determining that the first propulsion motor is experiencing at least one fault at approximately the second time,
wherein the third rotational speed and the second position are selected in response to determining that the first propulsion motor is experiencing the at least one fault.

7. The method of claim 6, wherein determining that the first propulsion motor is experiencing the at least one fault at approximately the second time comprises at least one of:
determining an electric current flowing to or from the first propulsion motor at approximately the second time;
determining a voltage drop across the first propulsion motor at approximately the second time;
determining that the first propulsion motor is operating at less than the second operating speed at approximately the second time;
determining that the aerial vehicle is not traveling along the course at the speed at approximately the second time;
determining that the aerial vehicle is not operating in the angular orientation at approximately the second time;
determining that a temperature associated with the first propulsion motor exceeds a predetermined threshold at approximately the second time;
analyzing an image depicting at least a portion of the first propulsion motor, wherein the image was captured at approximately the second time; or
analyzing acoustic energy emanating from the aerial vehicle, wherein the acoustic energy was captured at approximately the second time.

8. The method of claim 5, wherein the engagement system comprises at least one of a track, a rail, a screw-drive or a pulley within a cavity of the aerial vehicle, and
wherein causing the engagement system to move the at least one object from the first position to the second position comprises:
translating, by the at least one of the track, the rail, the screw-drive or the pulley, the at least one object from the first position to the second position.

9. The method of claim 5, wherein the first orientation comprises at least one of a first yaw angle, a first pitch angle, or a first roll angle of the aerial vehicle, and wherein the method further comprises:
determining, by at least one sensor provided aboard the aerial vehicle, that the aerial vehicle is aligned in a second orientation comprising at least one of a second yaw angle, a second pitch angle or a second roll angle,
wherein the engagement system is caused to move the at least one object from the first position to the second position in response to determining that the aerial vehicle is aligned in the second orientation.

10. The method of claim 5, wherein the at least one object comprises a payload engaged by the engagement system.

11. The method of claim 5, wherein the first position is aligned with a center of gravity of the aerial vehicle, and
wherein the method further comprises:
calculating a distance from the center of gravity based at least in part on the third rotational speed,
wherein the second position is provided at approximately the distance from the first position.

12. The method of claim 5, wherein the second propulsion motor is aligned in a first alignment prior to the second time, and
wherein the method further comprises:
selecting a second alignment for the second propulsion motor based at least in part on the second position and the third rotational speed; and
causing the second propulsion motor to be aligned in the second alignment.

13. The method of claim 5, wherein the first velocity is zero in a lateral or forward direction.

14. A method for operating an aerial vehicle, wherein the aerial vehicle comprises a first propulsion motor, a second propulsion motor and an engagement system configured to translate an engaged payload in at least one direction, and
wherein the method comprises:
causing the aerial vehicle to travel at a first velocity and in an angular orientation prior to a first time, wherein causing the aerial vehicle to travel at the first velocity and in the angular orientation prior to the first time comprises:
causing the first propulsion motor to operate at a first rotational speed prior to the first time;
causing the second propulsion motor to operate at a second rotational speed prior to the first time; and
causing the engagement system to place the engaged payload in a first position with respect to a centerline of the aerial vehicle;
identifying a fault in the first propulsion motor as of the first time;
in response to identifying the fault in the first propulsion motor,
causing the aerial vehicle to travel at one of the first velocity or a second velocity and in the angular orientation after the first time, wherein causing the aerial vehicle to travel at the one of the first velocity or the second velocity and in the angular orientation after the first time comprises:
selecting a third rotational speed for the second propulsion motor based at least in part on the identifying the fault;
selecting a second position for the engaged payload with respect to the centerline of the aerial vehicle;
causing the second propulsion motor to operate at the third rotational speed after the first time; and
causing the engaged payload to be translated to the second position after the first time.

15. The method of claim 14, wherein the first propulsion motor is aligned in a first alignment prior to the first time, and
  wherein the method further comprises:
    selecting a second alignment for the first propulsion motor based at least in part on the second position; and
    causing the first propulsion motor to be aligned in the second alignment after the first time.

16. The method of claim 14, wherein identifying the fault in the first propulsion motor comprises at least one of:
  determining an electric current flowing to or from the first propulsion motor at the first time;
  determining a voltage drop across the first propulsion motor at the first time;
  determining that the first propulsion motor is operating at less than the second operating speed at the first time;
  determining that the aerial vehicle is not traveling along the course at the speed at the first time;
  determining that the aerial vehicle is not operating in the angular orientation at the first time;
  determining that a temperature associated with the first propulsion motor exceeds a predetermined threshold;
  analyzing an image depicting at least a portion of the first propulsion motor, wherein the image was captured at approximately the first time; or
  analyzing acoustic energy emanating from the aerial vehicle, wherein the acoustic energy was captured at approximately the first time.

17. The method of claim 14, wherein the engagement system comprises at least one of a track, a rail, a screw-drive or a pulley within a cavity of the aerial vehicle, and
  wherein causing the engaged payload to be translated to the second position after the first time comprises:
    translating, by the at least one of the track, the rail, the screw-drive or the pulley, the at least one object from the first position to the second position.

18. The method of claim 14, wherein the first velocity is substantially zero in a vertical direction and greater than zero in a forward direction or a lateral direction, and
  wherein causing the aerial vehicle to travel on the one of the first velocity or the second velocity and in the angular orientation after the first time comprises:
    causing the aerial vehicle to travel at the first velocity and in the angular orientation after the first time.

19. The method of claim 14, wherein the first velocity is substantially zero, and
  wherein causing the aerial vehicle to travel on the one of the first velocity or the second velocity and in the angular orientation after the first time comprises:
    causing the aerial vehicle to travel at the first velocity and in the angular orientation after the first time.

20. The method of claim 14, wherein the second velocity is substantially zero in a forward direction or a lateral direction and greater than zero in a vertical direction,
  wherein causing the aerial vehicle to travel on the one of the first velocity or the second velocity and in the angular orientation after the first time comprises:
    causing the aerial vehicle to travel at the second velocity and in the angular orientation after the first time.

* * * * *